United States Patent
Hong et al.

(10) Patent No.: US 11,917,074 B2
(45) Date of Patent: Feb. 27, 2024

(54) ELECTRONIC SIGNATURE AUTHENTICATION SYSTEM BASED ON BIOMETRIC INFORMATION AND ELECTRONIC SIGNATURE AUTHENTICATION METHOD

(71) Applicant: SECUVE CO., LTD., Seoul (KR)

(72) Inventors: Ki Yoong Hong, Seoul (KR); Jong-Bin Ko, Incheon (KR)

(73) Assignee: Secuve Co., Ltd., Seoul (KR)

( * ) Notice: Subject to any disclaimer, the term of this patent is extended or adjusted under 35 U.S.C. 154(b) by 686 days.

(21) Appl. No.: 16/345,207

(22) PCT Filed: Dec. 11, 2017

(86) PCT No.: PCT/KR2017/014473
§ 371 (c)(1),
(2) Date: Oct. 14, 2021

(87) PCT Pub. No.: WO2019/093573
PCT Pub. Date: May 16, 2019

(65) Prior Publication Data
US 2022/0038291 A1    Feb. 3, 2022

(30) Foreign Application Priority Data

Nov. 7, 2017    (KR) .......................... 10-2017-0147207

(51) Int. Cl.
*H04L 9/32*    (2006.01)
*G06F 21/64*   (2013.01)
(Continued)

(52) U.S. Cl.
CPC ............ *H04L 9/3247* (2013.01); *G06F 21/64* (2013.01); *H04L 9/0866* (2013.01);
(Continued)

(58) Field of Classification Search
CPC ... H04L 9/3247; H04L 9/0866; H04L 9/0894; H04L 9/3231; H04L 9/3239; H04L 63/0861; G06F 21/64
See application file for complete search history.

(56) References Cited

U.S. PATENT DOCUMENTS 6,307,955 B1 *  10/2001  Zank ...................... G06V 40/30
                                              382/121
7,237,114 B1 *   6/2007  Rosenberg .......... G06F 21/6209
                                              713/193

(Continued)

FOREIGN PATENT DOCUMENTS

JP    2004-023649 A    1/2004
JP    2006-270697 A    10/2006

(Continued)

OTHER PUBLICATIONS

International Search Report of PCT/KR2017/014473, which is the parent—3 pages (dated Aug. 1, 2018).

*Primary Examiner* — Vance M Little
(74) *Attorney, Agent, or Firm* — Knobbe, Martens, Olson & Bear LLP

(57) ABSTRACT

The present disclosure provides an electronic signature authentication system and method capable of enhancing stability and reliability of an electronic signature by generating electronic signature information for authentication of an electronic document based on biometric information of a user. The electronic signature authentication system includes an authentication server, a user device, and an electronic document device, and is capable of providing identification of an electronic document provider among the electronic document provider, a signer of the electronic document, and a third party person using a signed electronic document, and providing verifications of integrity of the electronic document, prevention of repudiation of the signer, verification of (Continued)

whether the electronic document signed by the signer is identical to the electronic document provided by the electronic document provider, and a scheme for preventing falsification or tampering of the electronic document committed by the electronic document provider.

26 Claims, 17 Drawing Sheets

(51) Int. Cl.
  H04L 9/08 (2006.01)
  H04L 9/40 (2022.01)
(52) U.S. Cl.
  CPC .......... H04L 9/0894 (2013.01); H04L 9/3231 (2013.01); H04L 9/3239 (2013.01); H04L 63/0861 (2013.01)

(56) References Cited

U.S. PATENT DOCUMENTS

| | | | | |
|---|---|---|---|---|
| 2003/0012374 | A1* | 1/2003 | Wu | .................... H04L 9/3247 713/176 |
| 2004/0064705 | A1* | 4/2004 | Rivet | ........................ G07C 9/35 713/182 |
| 2005/0132195 | A1* | 6/2005 | Dietl | ..................... H04L 9/3231 713/176 |
| 2006/0159313 | A1* | 7/2006 | Hicks | ....................... G06F 9/451 382/119 |
| 2010/0106973 | A1* | 4/2010 | Guenther | ............... H04L 9/3231 713/176 |
| 2010/0268952 | A1* | 10/2010 | Chung | .................. H04L 9/3236 713/176 |
| 2011/0072274 | A1* | 3/2011 | Leoutsarakos | ...... H04L 63/0823 713/182 |
| 2011/0131661 | A1* | 6/2011 | Valls Fontanals | .... G06F 21/645 726/26 |
| 2011/0179289 | A1* | 7/2011 | Guenther | ................ G06F 21/83 713/189 |
| 2015/0280921 | A1* | 10/2015 | Geoffrey | ............... H04L 9/3247 713/176 |

FOREIGN PATENT DOCUMENTS

| | | |
|---|---|---|
| KR | 10-2004-0019810 A | 3/2004 |
| KR | 10-2009-0122657 A | 12/2009 |
| KR | 10-2015-0011755 A | 2/2015 |

\* cited by examiner

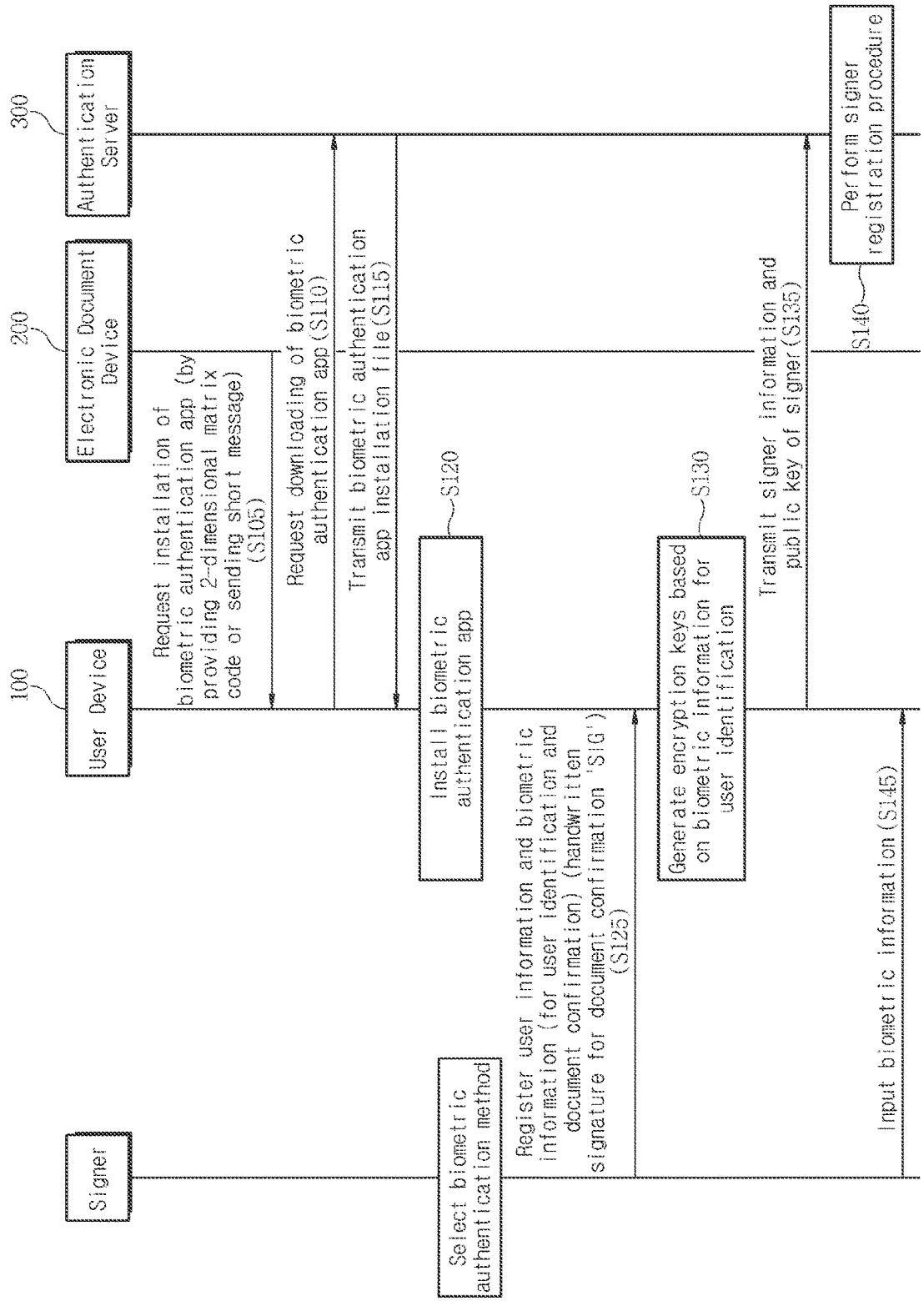

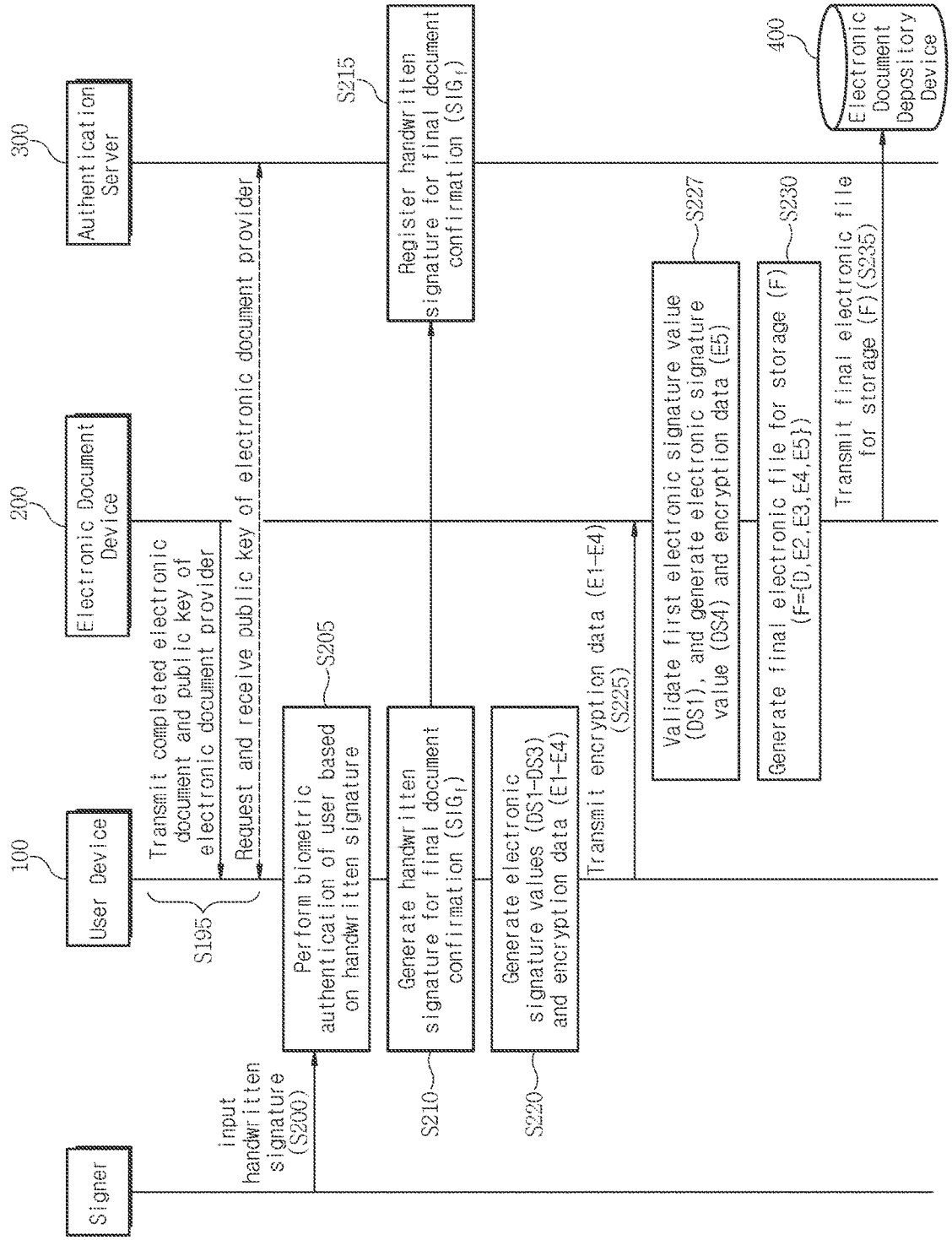

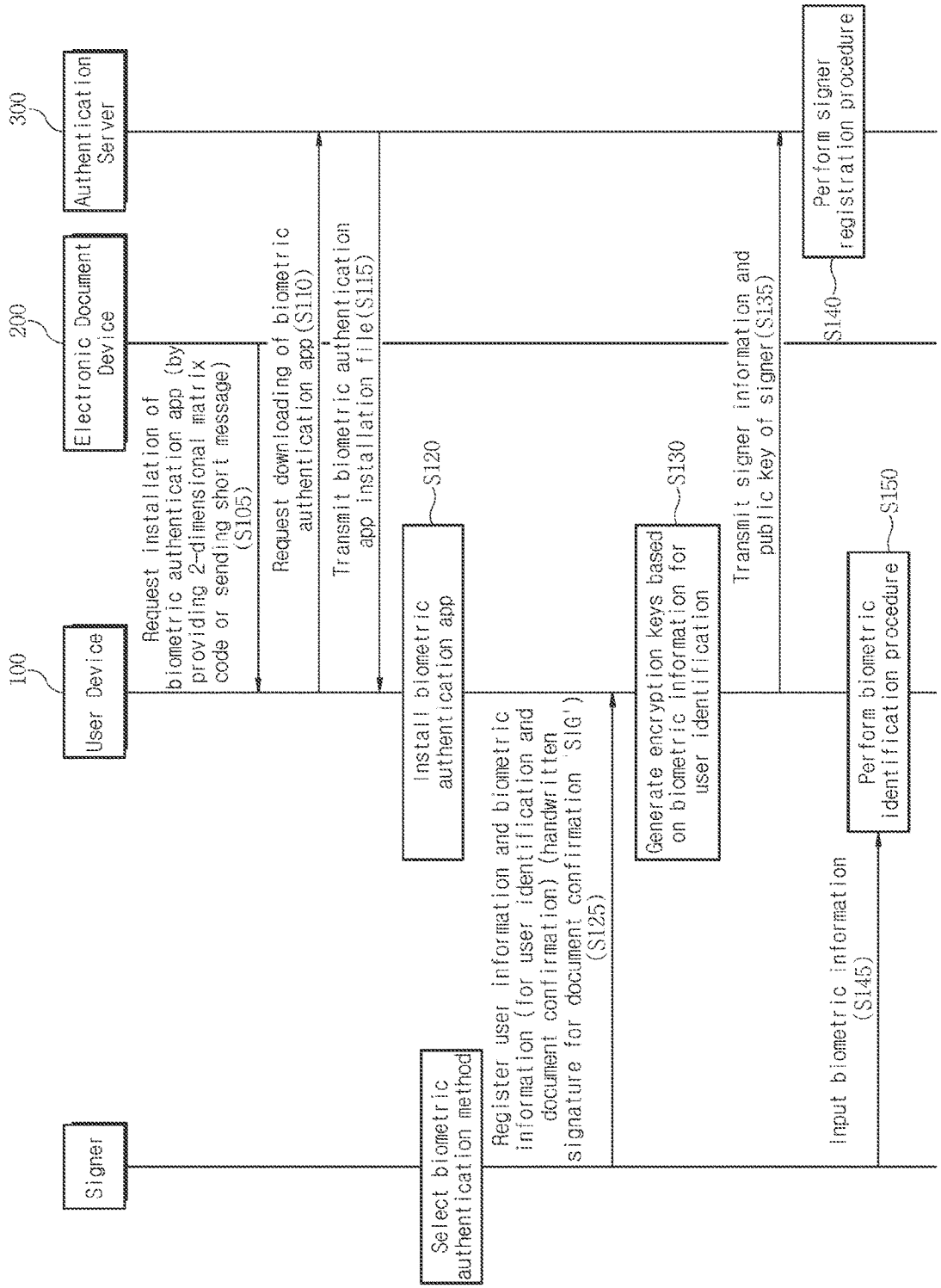

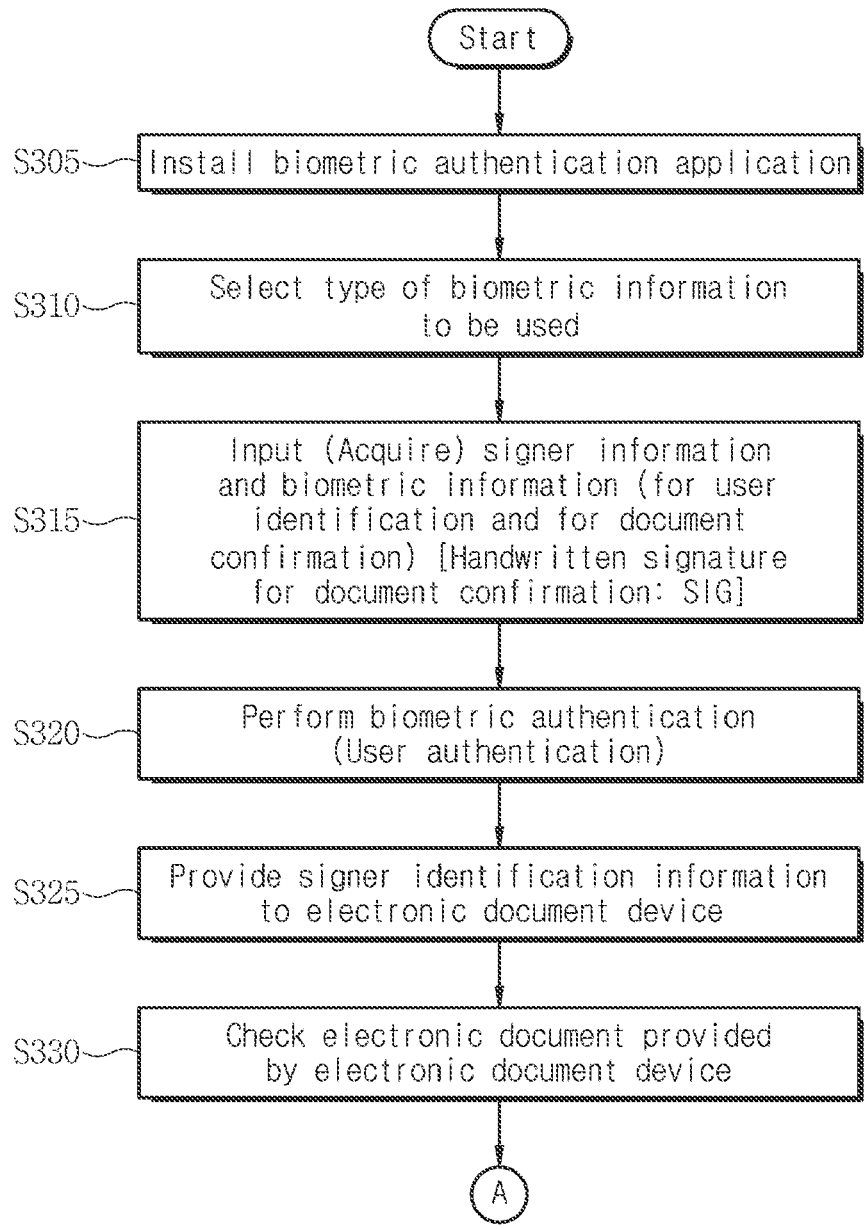

$D=\{M_0, \cdots M_{(m-1)}\} + \{(P_0 + SIG_0), \cdots (P_{(n-1)} + SIG_{(n-1)})\}$

ELECTRONIC SIGNATURE AUTHENTICATION SYSTEM BASED ON BIOMETRIC INFORMATION AND ELECTRONIC SIGNATURE AUTHENTICATION METHOD

TECHNICAL FIELD

The present disclosure relates to an electronic signature authentication system and method and, more particularly, to an electronic signature authentication system and method capable of enhancing stability and reliability of an electronic signature by generating electronic signature information for authentication of an electronic document based on biometric information of a user such as a handwritten signature, an iris pattern, a fingerprint, a palm veins pattern, and voice of the user.

BACKGROUND ART

Internet is a collection of networks connected to computer networks around the world and has been spreading rapidly due to its characteristics of facilitating non-face-to-face transaction, openness, a broadcast-type, a globality, and an easy accessibility. However, Internet inherently has security vulnerabilities such as tapping, tampering, falsification, malicious code, and password decryption. Various technologies have been developed to solve these security vulnerabilities.

Among the conventional technologies, an electronic signature is a form of electronic data that is attached to or logically associated with the electronic document by a signer to verify the signer's identity and to indicate that the signer consented to contents of the signed document.

Since the electronic signature does not encrypt the electronic document itself, there is no obstacle for a third party person to access and view the electronic document. However, the electronic signature can provide an evidence that the document was created by or under a consent of the signer and that the content of the electronic document has not been falsified or tampered, and prevent the signer from denying having signed the electronic document.

The electronic signature can be used as a tool for reducing a risk of information leakage that may occur in electronic commerce or electronic financial transactions, and thus can prevent intrusion or tampering of personal information.

The electronic signature is generally used in financial transactions such as Internet banking, Internet public services, and Internet shopping at present, but is expected to expand its usage to international electronic commerce, electronic voting, and the like in the future.

Conventionally, an electronic signature is created by generating a hash value of an electronic document to be signed and encrypting the hash value by a public key encryption algorithm to provide non-repudiation. For example, when a user 'A' sends a message to a user 'B', the hash value of the message is encrypted using a private key of the user 'A'. The user 'B' receiving the message attached with the encrypted hash value may decrypt the encrypted hash value using a public key of the user 'A' and compare the decrypted hash value with another hash value computed from the message to verify that the message was received from the user 'A' and has not been tampered since it was signed.

A public key infrastructure (PKI) used for the electronic signature is an information protection standard allowing the encryption and decryption of data using the private key and the public key. A receiver of the electronic signature encrypted with the private key of a signer can verify the identity of the signer and the intactness of the electronic document by validating the received electronic signature using the public key of the signer.

A seed data unique to each user is required to generate the private key and the public key used for generation and authentication of the electronic signature. As the number of users using online transactions is increasing and as the areas to which the electronic signature authentication is applicable are expanding, there is a need for a method of efficiently generating and managing the private key and public key of the user.

On the other hand, in the case of electronic commerce at an electronic shopping mall or Internet public service provided by a public institution, a signer executes the electronic signature for an electronic document provided by a separate electronic document provider and a third party person receives and validates the electronically signed document. In such a case, the followings are required: identification of the electronic document provider, integrity of the electronic document, non-repudiation of the signer, verification of whether the electronic document signed by the signer is identical to the electronic document provided by the electronic document provider, and a scheme for preventing falsification or tampering of the electronic document committed by the electronic document provider However, since the verification is carried out only for a sender and a receiver of the electronic document according to the conventional electronic signature authentication method, the electronic signature cannot be validated effectively in case that the electronic document provider is different from the signer or a third party person is to verify the electronically signed document.

DISCLOSURE OF INVENTION

Technical Problem

An object of the present disclosure is to provide an electronic signature authentication system and method capable of enhancing stability and reliability of an electronic signature by generating electronic signature information for authentication of an electronic document based on biometric information of a user such as a handwritten signature, an iris pattern, a fingerprint, a palm veins pattern, and voice of the user.

The present disclosure also provides an electronic signature authentication system and method based on biometric information capable of providing an identification of an electronic document provider among the electronic document provider, a signer of the electronic document, and a third party person using a signed electronic document, and providing integrity verification of the electronic document, non-repudiation of the signer, verification of whether the electronic document signed by the signer is identical to the electronic document provided by the electronic document provider, and a scheme for preventing falsification or tampering of the electronic document committed by the electronic document provider.

Technical Solution

According to an aspect of an exemplary embodiment, an electronic signature authentication system based on biometric information, includes: an authentication server configured to register a public key of a signer generated based on biometric information for user identification and perform authentication of an electronic document that is electronically signed with a private key of the signer generated based on the biometric information for user identification by using the public key of the signer; an electronic document device configured to request an electronic signature for the electronic document to a user device, extract encryption data from data received from the user device, and generate a final electronic file for storage by combining the encryption data with the electronic document to transfer to the authentication server; and the user device configured to register the biometric information for user identification of the signer and a handwritten signature for document confirmation entered from the signer, generate the public key and the private key of the signer based on the registered biometric information for user identification, request a registration of the public key of the signer to the authentication server, receive a handwritten signature for document confirmation of the signer in response to a signature request from the electronic document device, determine whether the received handwritten signature for document confirmation matches the registered handwritten signature for document confirmation, complete the input of the signature in a signature field in the electronic document, generate an electronic signature value by using the private key of the signer, and generate the encryption data by encrypting the electronic signature value.

According to an aspect of another exemplary embodiment, an electronic signature authentication method based on biometric information is performed in a user device capable of being interfaced to an electronic document device and an authentication server to execute an electronic signature. The method includes: calculating a hash value of an electronic document received from the electronic document device; generating a handwritten signature for final document confirmation to register to the authentication server; calculating a hash value of a handwritten signature for final document confirmation and a hash value of at least one handwritten signature for document confirmation and encrypting the hash value of the handwritten signature received from the electronic document device, the hash value of the handwritten signature for final document confirmation, and the hash value of the at least one handwritten signature for document confirmation with a private key of a signer to generate a first electronic signature value for the electronic document, a second electronic signature value for the handwritten signature for final document confirmation, and a third electronic signature value for the at least one handwritten signature for document confirmation; generating a first encryption data by encrypting the hash value of the electronic document received from the electronic document device and the first electronic signature value with a public key of the electronic document provider, generating a second encryption data by encrypting the hash value of the electronic document received from the electronic document device and the first electronic signature value with a public key of the authentication server, generating a third encryption data by encrypting the handwritten signature for final document confirmation, the hash value of the handwritten signature for final document confirmation, and the second electronic signature value for the handwritten signature for final document confirmation with the public key of the authentication server, and generating a fourth encryption data by encrypting the at least one handwritten signature for document confirmation, the hash value of the at least one handwritten signature for document confirmation, the third electronic signature value for the at least one handwritten signature with the public key of the authentication server, and transmitting the first through fourth encryption data to the electronic document device.

According to another aspect of another exemplary embodiment, an electronic signature authentication method based on biometric information is performed in an electronic document device capable of being interfaced to a user device of a signer and an authentication server. The method includes: transmitting an electronic document to be signed to the user device; receiving, from the user device, a first encryption data generated by encrypting the hash value of the electronic document received by the user device and the first electronic signature value for the electronic document with a public key of an electronic document provider, a second encryption data generated by encrypting the hash value of the electronic document received by the user device and the first electronic signature value for the electronic document with a public key of the authentication server, a third encryption data generated by encrypting the handwritten signature for final document confirmation, a hash value of the handwritten signature for final document confirmation, the second electronic signature value for the handwritten signature for final document confirmation with the public key of the authentication server, and a fourth encryption data generated by encrypting the at least one handwritten signature for document confirmation inserted into the electronic document, the hash value of the at least one handwritten signature for document confirmation, and a third electronic signature value for the handwritten signature for document confirmation with the public key of the authentication server; generating a fourth electronic signature value by encrypting the hash value calculated by the electronic document device for the electronic document with the private key of the electronic document provider and generating a fifth encryption data by encrypting the hash value calculated for the electronic document and the fourth electronic signature value with the public key of the authentication server; and combining the second through fourth encryption received from the user device along with the fifth encryption data to the electronic document to generate a final electronic file for storage. The first through third electronic signature values are generated by using the private key based on the biometric information of the signer.

According to yet another aspect of another exemplary embodiment, an electronic signature authentication method based on biometric information is performed in an authentication server capable of being interfaced to a user device of a signer and an electronic document device of an electronic document provider. The method includes: receiving an electronic file to be verified which combines a second encryption data generated by encrypting the hash value of the electronic document received by the user device calculated by the user device and the first electronic signature value for the electronic document with a public key of the authentication server, a third encryption data generated by encrypting the handwritten signature for final document confirmation, a hash value of the handwritten signature for final document confirmation, the second electronic signature value for the handwritten signature for final document confirmation with the public key of the authentication server, a fourth encryption data generated by encrypting the at least one handwritten signature for document confirmation inserted into the electronic document, the hash value of the at least one handwritten signature for document confirmation, and a third electronic signature value for the handwritten signature for document confirmation with the public key of the authentication server, and a fifth encryption data generated by encrypting the hash value calculated for the electronic document by the electronic document device and a fourth electronic signature value generated by encrypting the hash value calculated for the electronic document with the private key of the electronic document provider with the public key of the authentication server; decrypting the second through fifth encryption data combined to the electronic file to be verified with a private key of the authentication server to extract the hash value calculated by the user device for the electronic document, the first electronic signature value for the electronic document, the handwritten signature for final document confirmation, the hash value of the handwritten signature for final document confirmation, the second electronic signature value for the handwritten signature for final document confirmation, the at least one handwritten signature for document confirmation inserted into the electronic document, the hash value of the at least one handwritten signature for document confirmation, the third electronic signature value for the handwritten signature for document confirmation, the hash value calculated by the electronic document device for the electronic document, and a fourth electronic signature value for the electronic document; calculating a hash value of an electronic document combined in the electronic file to be verified and verifying an integrity of the electronic document assuring that the electronic document extracted from the electronic file to be verified is the electronic document generated by the electronic document provider by comparing the hash value calculated by the authentication server for the electronic document extracted from the electronic file to be verified, the hash value extracted by decrypting the fourth electronic signature value with the public key of the electronic document provider, and the hash value calculated by the electronic document device for the electronic document and extracted from the fifth encryption data with each other; calculating a hash value of the at least one handwritten signature for document confirmation extracted from the electronic file to be verified and verifying an integrity of the at least one handwritten signature for document confirmation included in the electronic file to be verified by comparing the hash value calculated, by the authentication server, for the at least one handwritten signature for document confirmation extracted from the electronic file to be verified, the hash value of the at least one handwritten signature for document confirmation extracted by decrypting the third electronic signature value with the public key of the signer, and the hash value calculated by the user device for the at least one handwritten signature for document confirmation and extracted from the fourth encryption data with each other; calculating a hash value of the handwritten signature for final document confirmation extracted from the electronic file to be verified and verifying an integrity of the handwritten signature for final document confirmation included in the electronic file to be verified by comparing the hash value calculated, by the authentication server, for the handwritten signature for final document confirmation extracted from the electronic file to be verified, the hash value of the handwritten signature for final document confirmation extracted by decrypting the second electronic signature value with the public key of the signer, and the hash value of the handwritten signature for final document confirmation extracted from the third encryption data with each other; and calculating a hash value of the electronic document extracted from the electronic file to be verified and verifying at least one of: non-repudiation of the electronic signature of the signer, non-repudiation of the electronic signature of the electronic document provider, consistency between the electronic document signed by the signer and the electronic document signed by the electronic document provider, and integrity of the electronic document by comparing the hash value calculated by the authentication server for the electronic document extracted from the electronic file to be verified, the hash value of the electronic document extracted by decrypting the first electronic signature value with the public key of the signer, the hash value calculated by the user device for the electronic document received by the user device, and the hash value calculated by the electronic document provider for the electronic document generated by the electronic document provider.

The electronic signature authentication method based on biometric information described above may be implemented by a computer program stored in a non-transitory computer-readable storage medium.

Advantageous Effects

The present disclosure is applicable to a field of digital signature authentication of an electronic document. In the generation of an electronic signature for an electronic document, biometric authentication is performed based on the biometric information of the signer so as to assure safety of data. Since a public key and a private key for executing the electronic signature are generated based on the biometric information that is unique to the signer, it is possible to enhance the efficiency of generating and managing the public key and the private key and generate the keys safely and reliably.

In particular, the present disclosure enables to identify an electronic document provider among the electronic document provider, a signer of the electronic document, and a third party person using a signed electronic document, facilitates verification of integrity of the electronic document, prevention of repudiation of the signer, verification of whether the electronic document signed by the signer is identical to the electronic document provided by the electronic document provider, and prevention of falsification or tampering of the electronic document committed by the electronic document provider, so as to provide a safe and reliable electronic signature authentication service.

In addition, the present disclosure can further enhance the non-repudiation effect of the signer with respect to a generated electronic document by further combining biometric handwritten signature of the signer in a series of processes of creating and signing the electronic document and checking and verifying the signed electronic document.

DESCRIPTION OF DRAWINGS

FIGS. 2A through 2C are flowcharts illustrating an electronic signature authentication process based on biometric information according to a first embodiment of the present disclosure;

FIGS. 3A through 3C are flowcharts illustrating an electronic signature authentication process based on biometric information according to a second embodiment of the present disclosure;

FIGS. 4A and 4B are flowcharts illustrating an operation of a user device in the electronic signature authentication system based on biometric information according to the present disclosure;

BEST MODE

Figure 1:
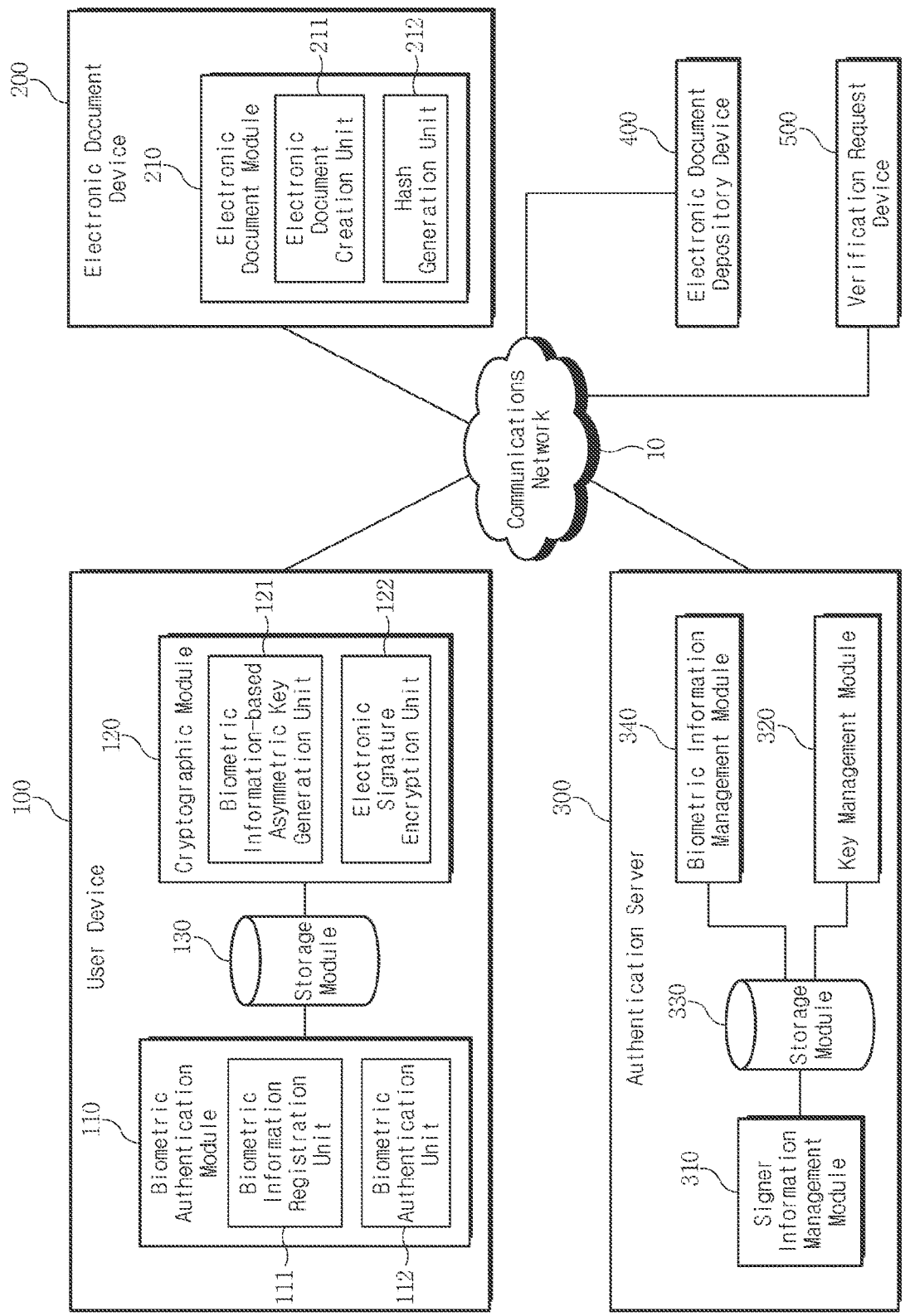
FIG. 1 is a block diagram of an electronic signature authentication system based on biometric information according to an exemplary embodiment of the present disclosure.

For a clearer understanding of the features and advantages of the present disclosure, the present disclosure will be described in detail with reference to the accompanied drawings. In the following description and the accompanied drawings, detailed descriptions of well-known functions or configuration that may obscure the subject matter of the present disclosure will be omitted for simplicity. It is to be noted that the same components are designated by the same reference numerals throughout the drawings.

The terms and words used in the following description and drawings are not necessarily to be construed in an ordinary sense or a dictionary, and may be appropriately defined herein to be used as terms for describing the present disclosure in the best way possible. Such terms and words should be construed as meaning and concept consistent with the technical idea of the present disclosure. It should be noted that the embodiments of the present disclosure described in the present specification and drawings are only illustrative of the present disclosure and are not intended to limit the scope of the present disclosure. It will be apparent to those skilled in the art that other modifications may be made based on the technical idea of the present disclosure in addition to the embodiments disclosed herein.

The terminologies including ordinals such as "first" and "second" used to explain various elements in this specification may be used to discriminate an element from the other ones, but the terms do not restrict the structures of the elements. For example, a second component may be referred to as a first component, and similarly, a first component may also be referred to as a second component without departing from the scope of the present disclosure.

When an element is referred to as being "connected" or "coupled" to another element, it means that it is logically or physically connected or it may be connected to the other element. In other words, it is to be understood that although an element may be directly connected or coupled to another element, there may be other elements therebetween, or element may be indirectly connected or coupled to the other element.

The terminologies used herein are only illustrative of the exemplary embodiments and are not intended to limit the scope of the present disclosure. The singular forms include plural referents unless the context clearly dictates otherwise. Also, the expressions "~comprises," "~includes," "~constructed," "~configured" are not to be construed as being equipped with all the components, processing steps, or operations described in this specification, but some of the components, the processing steps, or the operations may not be included and additional elements may be incorporated further.

In addition, in the following description and claims, the term "network" is defined as one or more data links that enable electronic data to be transmitted between computer systems and/or modules. When the information is transmitted or provided to a computer system via a network or other kind of communication connection which may be a wired connection, a wireless connection, or a combination of the wired or wireless connections, the connection may be understood as a computer-readable medium. Computer-executable instructions may include instructions and data that may cause a general purpose computer system or a special purpose computer system, for example, to perform a particular function or a group of functions. The computer-executable instructions have readily executable machine language forms but may have a form of a source code written in an assembly language or another kind of languages.

First, an overall configuration of an electronic signature authentication system based on biometric information according to the present disclosure will be described with reference to FIG. 1.

FIG. 1 is a block diagram of an electronic signature authentication system based on biometric information according to an exemplary embodiment of the present disclosure.

Referring to FIG. 1, the electronic signature authentication system based on biometric information according to the present disclosure includes a user device 100, an electronic document device 200, an authentication server 300, an electronic document depository device 400, and a verification request device 500 which are connected through a communications network 10.

The user device 100, which is used by a user executing electronic signature (hereinafter, referred to as "signer"), registers biometric information of the signer and generates encryption keys based on registered biometric information. In more detail, the user device 100 generates a private key and a public key, which are asymmetric keys, of the user. The user device 100 generates the electronic signature for an electronic document, using the private key, for which the electronic signature is requested. Any device having a memory and a processor and being capable of performing communication functions to access the communications network 10 for transmitting and receiving data and biometric information input function to recognize biometric information may be used for the user device 100. For example, the user device 100 may be implemented by a smartphone or a tablet PC having the biometric information input functionality, or a smartphone or a tablet PC connected to a biometric information input device.

The user device 100 may store, in the memory, an application program (hereinafter, referred to as "biometric authentication application") for performing biometric information-based electronic signature authentication according to the present disclosure and load and execute the biometric authentication application to perform the biometric information-based electronic signature authentication according to the present disclosure.

For the biometric information-based electronic signature authentication process, the user device 100 may include a biometric authentication module 110, a cryptographic module 120, and a storage module 130. The biometric authentication module 110, the cryptographic module 120, and the storage module 130 may be implemented by hardware, software, or a combination of hardware and software, and may be activated by loading and executing the biometric authentication application stored in the memory by the processor.

The biometric authentication module 110 includes a biometric information registration unit 111 suitable for registering the biometric information of the signer input through the user device 100 into the storage module 130 and a biometric authentication unit 112 suitable for performing the authentication of a user by comparing biometric information currently being input with the registered biometric information.

The cryptographic module 120 includes a biometric information-based asymmetric key generation unit 121 suitable for generating the private key and the public key for use in the electronic signature based on the biometric information registered in the storage module 130 and storing the private key and the public key into the storage module 130 and an electronic signature encryption unit 122 suitable for generating electronic signature information for the electronic document provided by the electronic document device 200 by use of the generated private key. In order to keep the stored keys secret, the storage module 130 may be configured as a hardware security module, an encryption storage module, or a hardware security token that can be connected externally to the user device 100.

The electronic document device 200 is a device used by an electronic document provider or a signature requester who requests the electronic signature for an electronic document. The electronic document device 200 provides the user device 100 with an electronic document that needs the execution of the electronic signature and generates a final electronic document file for storage by combining electronic signature generated by the user device 100 to the electronic document. Any device capable of handling the electronic document can be used for the electronic document device 200. The electronic document provider may be an institution or a government agency issuing a document requiring the electronic signature, an insurance company or an insurance sales agent performing a transaction requiring a user authentication, an electronic commerce company, or a financial company, for example. The electronic document device 200 may be a server device operated by the electronic document provider or may be a general purpose computer device or a portable terminal device such as the tablet PC and the smart phone used by the electronic document provider.

The electronic document device 200 may include an electronic document module 210 suitable for handing the electronic document. The electronic document module 210 may be implemented by hardware, software, or a combination of hardware and software. For example, the electronic document module 210 may be implemented by a program module that is stored in the memory and loaded and executed by the processor to perform the function.

The electronic document module 210 may include an electronic document creation unit 211 suitable for creating the electronic document in accordance with a user input signal and a hash value generation unit 212 suitable for generating a hash value of the electronic document created in advance.

The authentication server 300 registers and maintains information needed for the electronic signature authentication based on the biometric information according to the present disclosure and validates the electronic signature combined with the electronic document based on the registered information.

The authentication server 300 includes a signer information management module 310, a key management module 320, a storage module 330, and a biometric information management module 340.

The signer information management module 310 collects information on signers using electronic signature based on the biometric information and registers the collected information to the storage module 330. The key management module 320 registers public key information of the registered signers to the storage module 330 and manages the registered public key information. The biometric information management module 340 registers and manages biometric information for final document confirmation. Here, the storage module 330 may be configured as a hardware security module, an encryption storage module, or a hardware security token that can be connected externally to the user device 100 in order to keep the stored biometric information secure. The biometric information for final document confirmation may be a handwritten signature, for example.

The electronic document depository device 400 stores the electronic document. In an exemplary embodiment of the present disclosure, the electronic document depository device 400 may store the final electronically signed document file for storage received from the electronic document device 200. However, the present disclosure is not limited thereto, and the electronic document depository device 400 may be accessible by the user device 100 or the authentication server 300 if necessary. The electronic document depository device 400 may be implemented by a network-attached storage (NAS). Also, the electronic document depository device 400 may be integrated into a single device with another device such as the electronic document device 200 or the authentication server 300.

The verification request device 500 is an arbitrary user device that uses the issued electronic file to be validated according to the present disclosure, and can request the authentication server 300 to validate an issued electronic file to be validated.

An electronic signature authentication method based on the biometric information provided on the basis of the system configured as above according to the present disclosure will now be described. In order to facilitate understanding of the present disclosure, a signer is denoted by a user "U", an electronic document provider is denoted by a service provider "SP", an authentication server is denoted by a server "S" in the following description. The private key and the public key of each of the signer, the electronic document provider, and the authentication server are denoted by "SK" and "PK", respectively. Further, a completed electronic document to be subjected to the electronic signature is denoted by "D", an electronic document received by the user device 100 of the signer is denoted by "D'", the final electronic file for which the execution of the electronic signature has been completed is denoted by "F", and the electronic file to be validated is denoted by "V".

Figure 2B:
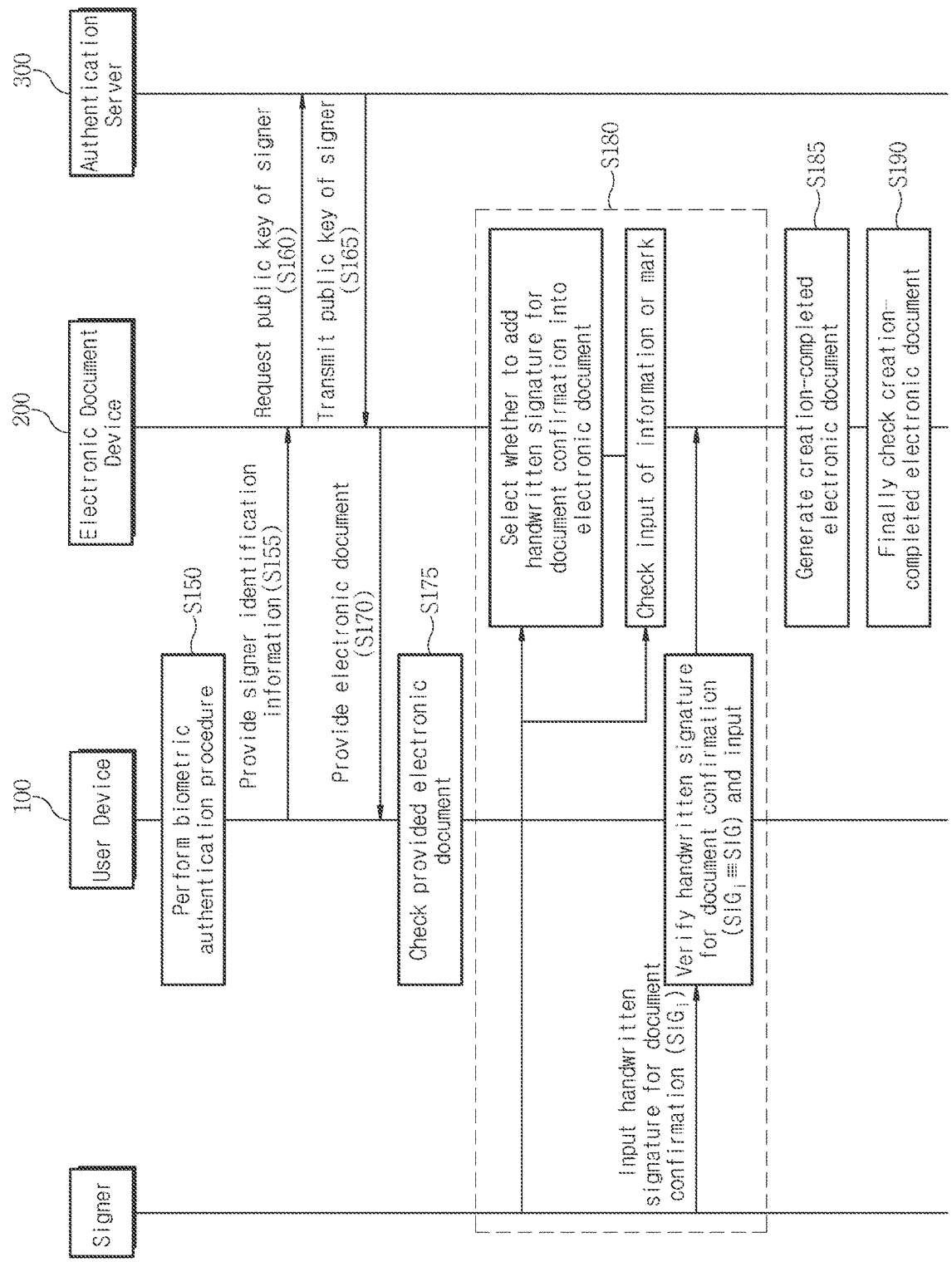

FIGS. 2A through 2C are flowcharts illustrating the electronic signature authentication process based on the biometric information according to a first embodiment of the present disclosure. In the first embodiment of the present disclosure, it is assumed that the electronic document device 200 is a portable terminal device such as a tablet PC of another user and that the electronic document device 200 communicates with the signer's user device 100 through the communications network 10 including a local area network such as a Bluetooth and Wi-Fi to provide an electronic document to the user device 100 and receives an electronic signature for the provided electronic document from the user device 100.

For performing the electronic signature authentication process based on the biometric information according to the present disclosure, information related to the signer must be registered in advance.

To this end, the user device 100 must install the biometric authentication application that is programmed to implement the biometric authentication module 110, the cryptographic module 120, and the storage module 130 shown in FIG. 1. The installation of the application may be accomplished as follows.

In case that the biometric authentication application is not installed in the user device 100, the electronic document device 200 connected to the user device 100 through the communication link may request the user device 100 to install the biometric authentication application (S105). The request may be presented by providing a two-dimensional matrix code such as a two-dimensional bar code and a QR code which contains access information (e.g., URL) of a site for downloading the biometric authentication application or by transmitting a short message containing the access information. In the present embodiment, it is assumed that the biometric authentication application is provided by the authentication server 300.

The user device 100 may access the authentication server 300 corresponding to the access information through the communications network 10 to request downloading of the biometric authentication application (S110). The authentication server 300 may transmit a biometric authentication application installation file in response to the request, and the user device 100 receives the installation file and installs biometric authentication application in the local memory (S115, S120).

In an alternative embodiment, a separate application store server rather than the authentication server 300 may provide the biometric authentication application to the user device 100. In such a case, the operations S110 and S115 may be performed between the user device 100 and the application store server (not shown).

The user device 100 installed with the biometric authentication application as above may perform the electronic signature authentication process based on the biometric information which is described below through an execution of the biometric authentication application.

First, the user device 100 receives signer information ($U_{info}$) and biometric information to be used for electronic signature authentication from the signer and registers the received information (S125). In detail, the signer may select one or more type of the biometric information such as a handwritten signature, an iris pattern, a fingerprint, a palm veins pattern, voice, face, and the like, and input biometric information of a selected type to the user device 100 through a biometric information input device (not shown in the drawings). In more detail, while selecting the type of the biometric information, the signer may select the types of biometric information for user identification and biometric information for document confirmation separately, and input each biometric information of the selected types to the user device 100 through respective biometric information input devices for registration. Here, a handwritten signature may generally be used as the biometric information for document confirmation. Hereinafter, the handwritten signature for document confirmation that is registered in the operation S125 is denoted by "SIG". The registered handwritten signature for document confirmation (SIG) may include one or both of image information (SIG.image) of the handwritten signature for document confirmation and biometric characteristic information (SIG.bio) of the handwritten signature for document confirmation based on a unique action or behavior of the signer.

The signer information ($U_{info}$) may include general information including name, affiliation, and photograph of the signer as well as signer identification information ($U_{id}$) that can be used for identifying the signer. The signer identification information ($U_{id}$) may be a signer ID, identification information of the user device 100, or unique information (e.g., date of birth, a mobile phone number of the signer, etc.).

After the type of the biometric information is selected and the biometric information of the selected type is registered, the cryptographic module 120 of the user device 100 generates encryption keys to be used for generating the electronic signature based on the registered biometric information (S130). In this case, the biometric information for user identification may be used in the generation of the encryption keys. The generated encryption keys are an asymmetric key pair including the private key ($U_{SK}$) and the public key ($U_{PK}$).

After the private key ($U_{SK}$) and public key ($U_{PK}$) are generated based on the biometric information, the user device 100 transmits the public key ($U_{PK}$) to the authentication server 300 together with the signer information ($U_{info}$) including the signer identification information to request the registration of the information (S135).

Subsequently, the authentication server 300 may perform a signer registration procedure to register the public key ($U_{PK}$) received from the user device 100 to be mapped into the signer information ($U_{info}$) including the signer identification information (S140).

After the signer registration is completed, the user can carry out the electronic signature process based on the biometric information, which is performed as follows.

If the signer wishes to execute the electronic signature, the user may input the biometric information of the type selected by the user to request the execution of the electronic signature (S145). The input of the biometric information may be carried out at once with the execution of the electronic signature. Alternatively, however, the input of the biometric information may be performed according to the request for the execution of the electronic signature, or the request for the execution of the electronic signature may be carried out after the input of the biometric information.

The user device 100 first performs the authentication of the user by comparing the input biometric information with the registered biometric information (S150). If the input biometric information matches the registered biometric information, the user device 100 determines that the identity of the user is valid.

When the user authentication is successful, the user device 100 sends signer identification information ($U_{id}$) to the electronic document device 200 so that the electronic document device 200 can acquire the public key ($U_{PK}$) of the signer that is registered previously (S155). In this process, the user device 100 may generate and output a two-dimensional matrix code such as the QR code containing the signer identification information ($U_{id}$), so that the electronic document device 200 may read the two-dimensional matrix code to extract the signer identification information ($U_{id}$).

The electronic document device 200 having acquired the signer identification information ($U_{id}$) may send the signer identification information ($U_{id}$) to the authentication server 300 to request the public key ($U_{PK}$) of the signer (S160).

The authentication server 300 extracts the public key ($U_{PK}$) of the registered signer corresponding to the signer identification information ($U_{id}$) and transmits the public key ($U_{PK}$) to the electronic document device 200 (S165).

Afterwards, the electronic document device 200 provides the user device 100 with the electronic document to be signed (S170), and the user device 100 outputs the electronic document so that the signer can check the electronic document (S175).

Subsequently, the electronic document device 200 allows the user to select whether to add the handwritten signature for document confirmation ($SIG_i$) into the electronic document, allows the user to input any required information or mark in input fields of the electronic document, and confirms the input of such information or mark in the electronic document. In case that the handwritten signature for document confirmation ($SIG_i$) is to be added into the electronic document, the electronic document device 200 receives the handwritten signature for document confirmation ($SIG_i$), from the user device 100, that is entered by the user and validated to match the registered handwritten signature for document confirmation (SIG) (S180). The received handwritten signature for document confirmation ($SIG_i$) may include image information ($SIG_i$.image) of the handwritten signature for document confirmation and biometric characteristic information ($SIG_i$.bio) of the handwritten signature for document confirmation based on a unique action or behavior of the signer. Therefore, the received handwritten signature for document confirmation ($SIG_i$) is verified to match the registered handwritten signature for document confirmation (SIG) when the image information ($SIG_i$.image) of the received handwritten signature for document confirmation matches the image information (SIG.image) of the registered handwritten signature for document confirmation and the biometric characteristic information ($SIG_i$.bio) of the received handwritten signature for document confirmation matches biometric characteristic information (SIG.bio) of the registered handwritten signature for document confirmation. To summarize, the received handwritten signature for document confirmation ($SIG_i$) may include one or both of the image information ($SIG_i$.image) of the handwritten signature and the biometric characteristic information ($SIG_i$.bio) of the handwritten signature based on the unique action or behavior of the signer. In this case, in accordance with the input from the signer, the electronic document device 200 may add the information or mark to the input fields of the electronic document where the input of the information or mark is required.

In detail, the user device 100 notifies a handwritten signature request from the electronic document device 200 to the signer and receives the handwritten signature for document confirmation ($SIG_i$) entered by the signer through the biometric information input device (not shown) to deliver to the electronic document device 200. Here, the received handwritten signature for document confirmation ($SIG_i$) delivered to the electronic document device 200 may include one or both of the image information ($SIG_i$.image) of the handwritten signature for document confirmation and the biometric characteristic information ($SIG_i$.bio), based on the unique action or behavior of the signer, of the handwritten signature for document confirmation as described above. In other words, the received handwritten signature for document confirmation ($SIG_i$) delivered to the electronic document device 200 may include only the handwritten signature image information ($SIG_i$.image) depending on a level of security and reliability of the electronic document provider and the electronic document device 200. Further, the operation S180 may be repeatedly carried out as many times as the handwritten signature for document confirmation ($SIG_i$) is necessary. Thus, assuming that a number of inputs of the handwritten signature ($SIG_i$) is denoted by "n", the subscript index "i" in the handwritten signature ($SIG_i$) may have a value of: i=0,1,2, ... , (n−1).

When the checking of the electronic document including the input of the handwritten signature for document confirmation ($SIG_i$) is completed by the signer, the electronic document device 200 generates the completed electronic document (D) (S185). The completed electronic document (D) includes one or more handwritten signature ($SIG_i$), where i=0, 1, 2, ... , (n−1).

After the signer's final confirmation is made for the completed electronic document (D) (S190), the user device 100 receives the completed electronic document (D) and the public key of the electronic document provider ($SP_{PK}$) from the electronic document device 200. Here, though the electronic document transmitted by the electronic document device 200 is denoted by "D", the electronic document received by the user device 100 and corresponding to the electronic document (D) is denoted by "D'". Also, the hash value generated by the electronic document device 200 for the electronic document (D) is denoted by "H1" while the hash value separately calculated for the electronic document (D') received by the user device is denoted by "H1'".

The completed electronic document (D) is transmitted from the electronic document device 200 to the user device 100 while the public key of the electronic document provider ($SP_{PK}$) may be provided by the electronic document device 200 or the authentication server 300. That is, the user device 100 may receive both the completed electronic document (D) and the public key of the electronic document provider ($SP_{PK}$) from the electronic document device 200 or may receive the electronic document (D) from the electronic document device 200 while requesting and receiving the public key of the electronic document provider ($SP_{PK}$) from the authentication server 300 (S195).

Before the electronic signature is generated, the user device 100 receives the handwritten signature from the signer (S200), performs authentication for the entered handwritten signature (S205), generates a handwritten signature for final document confirmation ($SIG_f$), and requests the registration thereof to the authentication server 300 if the authentication of the entered handwritten signature is successful (S210). Accordingly, the authentication server 300 may register the handwritten signature for final document confirmation ($SIG_f$) together with the registered public key of the signer ($U_{PK}$) being mapped with the signer identification information ($U_{id}$) (S215). As described above, the received handwritten signature for document confirmation ($SIG_i$) is verified to match the registered handwritten signature for document confirmation (SIG) when the image information ($SIG_i$.image) of the received handwritten signature for document confirmation matches the image information (SIG.image) of the registered handwritten signature for document confirmation and the biometric characteristic information ($SIG_i$.bio) of the received handwritten signature for document confirmation matches biometric characteristic information (SIG.bio) of the registered handwritten signature for document confirmation. The entered handwritten signature having succeeded in the authentication is registered in the authentication server 300 as the handwritten signature for final document confirmation ($SIG_f$). Here, the handwritten signature for final document confirmation ($SIG_f$) that is registered in the authentication server 300 may include one or both of the image information ($SIG_f$.image) of the handwritten signature and the biometric characteristic information ($SIG_f$.bio) of the handwritten signature based on the unique action or behavior of the signer Afterwards, the user device 100 generates a first through third electronic signature values and a first through fourth encryption data (S220) and transmits the first through fourth encryption data to the electronic document device 200 (S225).

To be more specific, in step S220, the user device 100 first generates the first electronic signature value (DS1) by encrypting the hash value (H1') of the completed electronic document (D') received already with the private key ($U_{SK}$) of the signer based on the registered biometric information (i.e., DS1←[H1']$U_{SK}$).

Also, the user device 100 may calculate a hash value (H2) of the handwritten signature for final document confirmation ($SIG_f$) and generate the second electronic signature value (DS2) by encrypting the hash value (H2) with the private key ($U_{SK}$) of the signer based on the registered biometric information (i.e., DS2←[H2]$U_{SK}$).

Also, the user device 100 may calculate a hash value (H3) of the handwritten signature for document confirmation {$SIG_0$, $SIG_1$, $SIG_2$, . . . , $SIG_{(n-1)}$} and generate the third electronic signature value (DS3) by encrypting the hash value (H3) with the private key ($U_{SK}$) of the signer based on the registered biometric information (i.e., DS3←[H3]$U_{SK}$).

Further, the user device 100 generates the first encryption data (E1) by encrypting the hash value (H1') and the first electronic signature value (DS1) with the public key ($SP_{PK}$) of the electronic document provider (i.e., E1←[H1', DS1] $SP_{PK}$). The user device 100 generates the second encryption data (E2) by encrypting the hash value (H1') and the first electronic signature value (DS1) with the public key ($S_{PK}$) of the authentication server 300 (i.e., E2←[H1', DS1]$S_{SK}$). The user device 100 generates the third encryption data (E3) by encrypting the handwritten signature for final document confirmation ($SIG_f$), the hash value (H2), and the second electronic signature value (DS2) with the public key ($S_{PK}$) of the authentication server 300 (i.e., E3←[$SIG_f$, H2, DS2] $S_{PK}$). The user device 100 generates the fourth encryption data (E4) by encrypting the handwritten signature for document confirmation {$SIG_0$, $SIG_1$, $SIG_2$, . . . , $SIG_{(n-1)}$}, the hash value (H3), and the third electronic signature value (DS3) with the public key ($S_{PK}$) of the authentication server 300 (i.e., E4←[{$SIG_0$, $SIG_1$, $SIG_2$, . . . , $SIG_{(n-1)}$}, H3, DS3]$S_{PK}$).

In operation S225, the user device 100 transmits the first through fourth encryption data (E1, E2, E3 and E4) to the electronic document device 200.

Afterwards, the electronic document device 200 generates a final electronic file for storage (F) of the completed electronic document (D).

In detail, the electronic document device 200 decrypts the received first encryption data (E1) with the private key ($SP_{SK}$) of the electronic document provider to extract the hash value (H1') of the electronic document (D') received by the user device 100 and the first electronic signature value (DS1). The electronic document device 200 compares a hash value ([DS1]$U_{PK}$) acquired by decrypting the first electronic signature value (DS1) with the public key ($U_{PK}$) of the signer, the hash value (H1') of the electronic document (D') extracted from the first encryption data, and the hash value (H1) calculated for the electronic document (D) by the electronic document provider. The electronic document device 200 verifies the first electronic signature value (DS1) by checking whether the hash values match one another (i.e., [DS1]$U_{PK}$≡H1'≡H1). The electronic document device 200 generates the fourth electronic signature value (DS4) by encrypting the hash value (H1) calculated for the completed electronic document (D) with the private key ($SP_{SK}$) of the electronic document provider (i.e., DS4←[H1]$SP_{SK}$). The electronic document device 200 generates a fifth encryption data (E5) by encrypting the hash value (H1) calculated for the completed electronic document (D) and the fourth electronic signature value (DS4) with the public key ($S_{PK}$) of the authentication server 300 (i.e., E5←[H1, DS4]$S_{PK}$) (S227). The electronic document device 200 combines the second through fourth encryption data (E2, E3, and E4) received from the user device 100 and the fifth encryption data (E5) to the completed electronic document (D) to generate the final electronic file for storage (F) (i.e., F←{D,E2, E3, E4, E5}) (S230). The final electronic file for storage (F) generated as above is an electronic document that is created by combining the electronic signature and the handwritten signature to the completed electronic document (D) by the authenticated user based on the biometric information.

Finally, the electronic document device 200 may transmit the final electronic file for storage (F) to the electronic document depository device 400 so that the electronic document depository device 400 stores the file (S235).

Through the above process, the final electronic file for storage (F) can be generated by combining the electronic signature and the handwritten signature to the completed electronic document (D) by the authenticated user based on the biometric information.

Figure 3B:
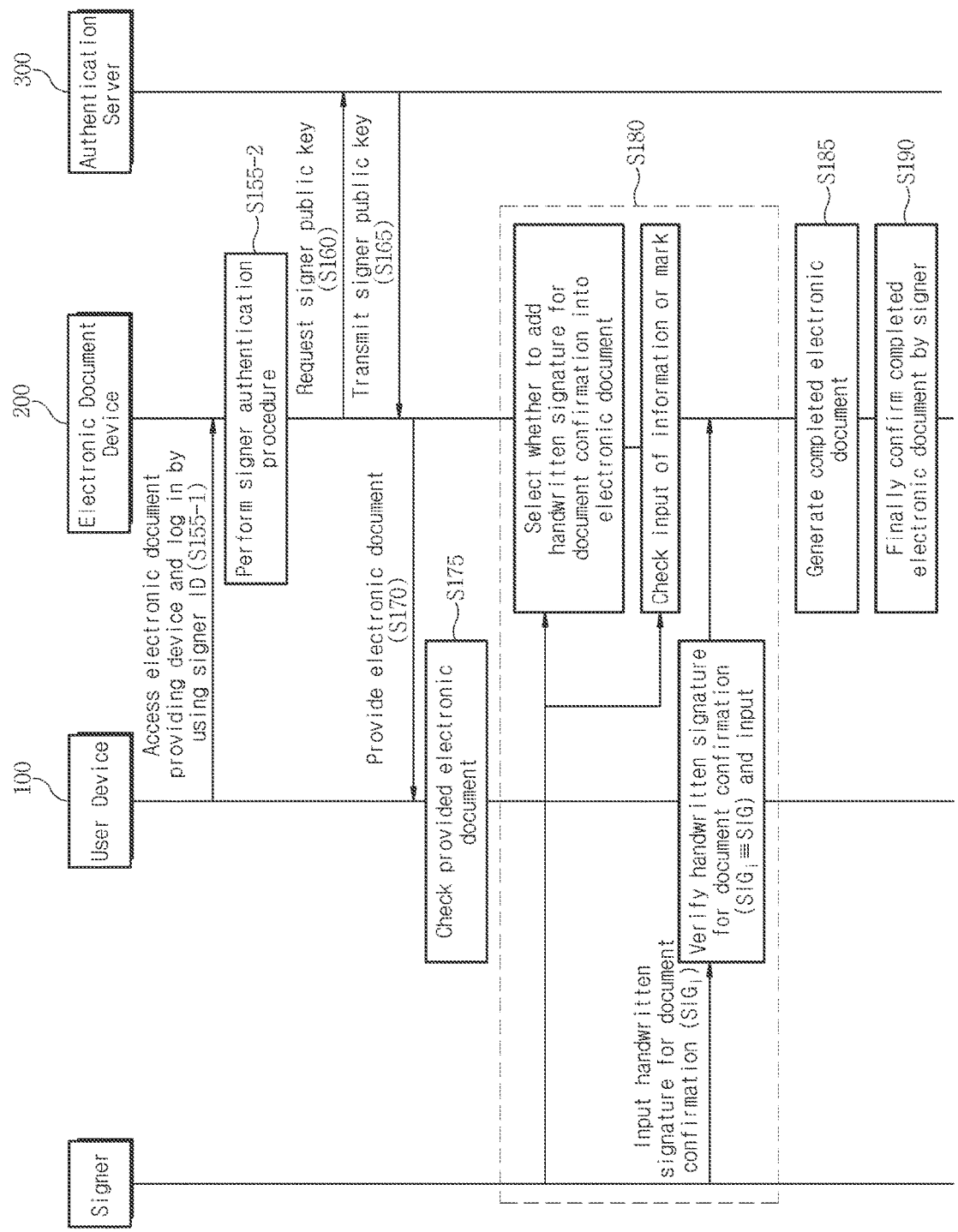
Figure 3C:
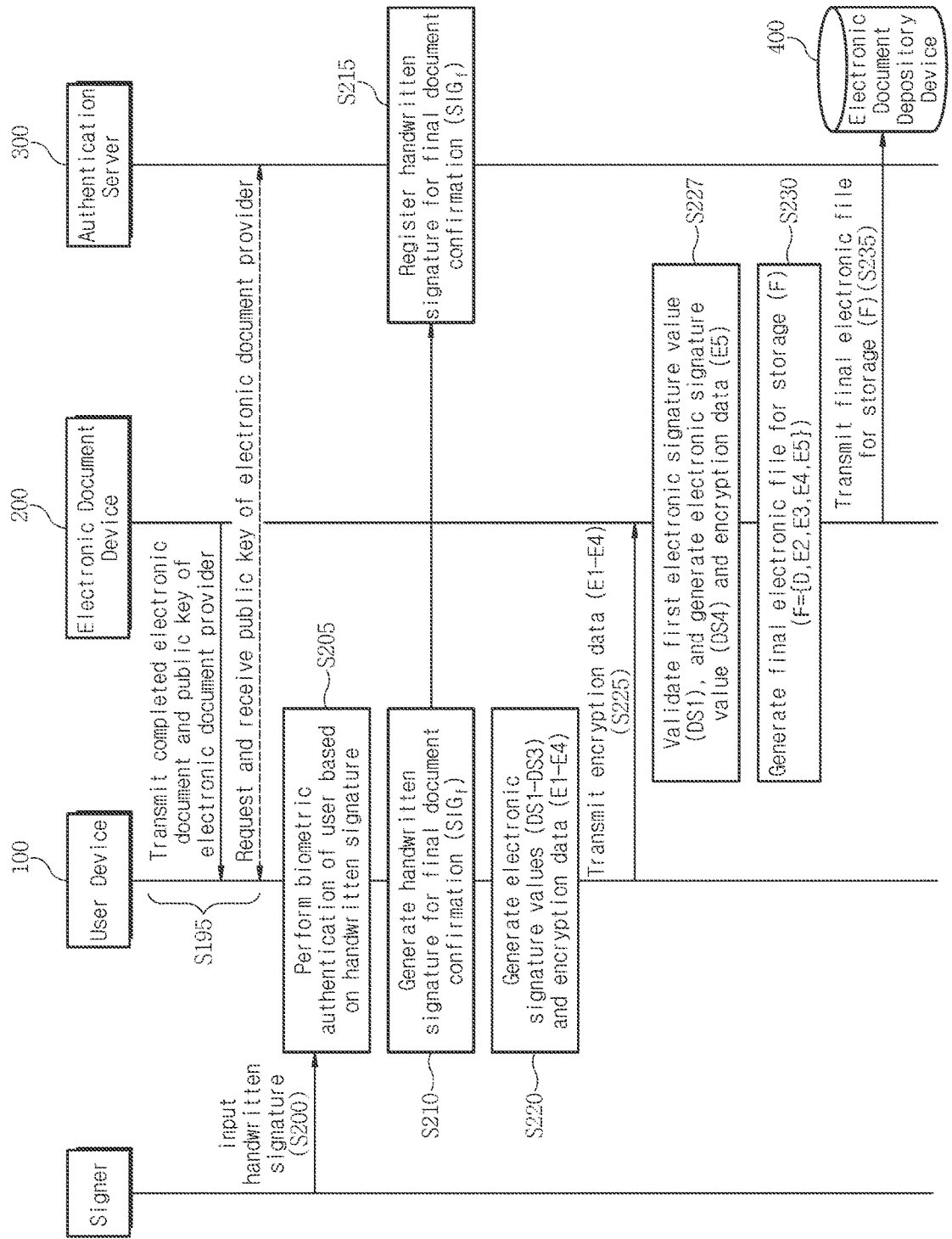

FIGS. 3A through 3C are flowcharts illustrating the electronic signature authentication process based on biometric information according to a second embodiment of the present disclosure. In the second embodiment of the present disclosure, the electronic document device 200 is implemented by a server device (e.g., a web server) that is accessible through the communications network 10, and the user of the user device 100 can use the service provided by the electronic document device 200 by accessing and logging in the electronic document device 200.

In the second embodiment, the operations that the electronic document device 200 checks the signer identification information ($U_{id}$) of the signer (S155-1, S155-2) replace the operation S155 in the first embodiment shown in FIGS. 2A through 2C. The other operations of the second embodiment are the same as those of the first embodiment.

In the first embodiment, the electronic document device 200 may be implemented by a portable user device such as a tablet PC, and the electronic document provider and the signer may face each other. Thus, if the user device 100 generates and outputs a two-dimensional matrix code such as the QR code including the signer identification information ($U_{id}$), the electronic document device 200 may extract the signer identification information ($U_{id}$) from the two-dimensional matrix code.

However, in the second embodiment of the present disclosure, since the electronic document device 200 is implemented by a web server operated by a financial company, an insurance company, or a service provider, for example, the electronic document provider and the signer are far apart from each other.

In this case, the signer who wishes to use the service has to access and log in the electronic document device 200 through the user device 100 (S155-1).

The electronic document device 200 performs a signer authentication procedure by using entered login ID and various additional authentication methods including passwords (S155-2). If the signer authentication is successful, the electronic document device 200 can extract the signer identification information ($U_{id}$) by identifying the login ID. In this case, the signer identification information ($U_{id}$) may be the login ID itself or another unique information (e.g., date of birth, a mobile phone number) distinguishable from other signers among various signer information mapped to the login ID.

After the signer identification information ($U_{id}$) is extracted as described above, the electronic document device 200 may transmit the signer identification information ($U_{id}$) to the authentication server 300 and request the public key ($U_{PK}$) of the signer corresponding to the signer identification information ($U_{id}$) (S160).

Since the other operations are performed in the same manner as the first embodiment, detailed description thereof will be omitted for simplicity.

The electronic signature authentication process based on the biometric information described above will be described in more detail with reference to FIGS. 4A through FIG. 12.

Figure 4B:
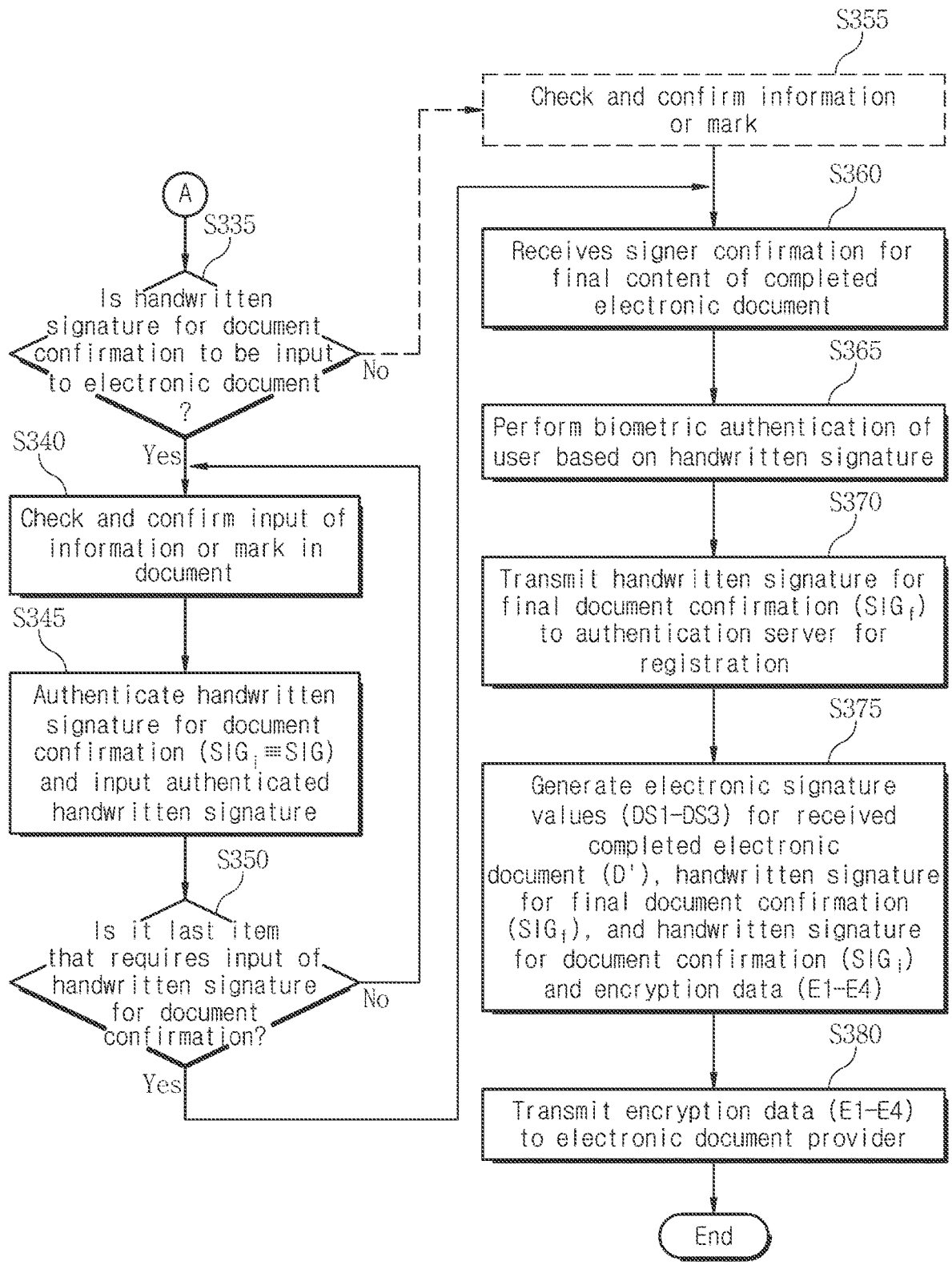

FIGS. 4A and 4B are flowcharts illustrating an operation of the user device 100 in the electronic signature authentication system based on the biometric information according to the present disclosure. The operation of the user device 100 will now be described with reference to FIGS. 4A and 4B.

In FIGS. 4A and 4B, operations S305 through S315 correspond to a signer registration process, and operations S320 through S380 correspond to a process of executing the electronic document. After the signer registration is performed, a signing process of an electronic document is executed by the registered signer.

In operation S305, the user device 100 downloads the biometric authentication application from the authentication server 300 or another application store server and installs the biometric authentication application to perform the function according to the present disclosure. Then, the user device 100 executes the biometric authentication application and receives, from the user, selection information for the type of biometric information to be used by the user (S310).

The user device 100 receives the biometric information corresponding to the type selected by the user through the biometric information input device (not shown) and registers the received biometric information. Also, the user device 100 receives signer information including the signer identification ($U_{id}$) and registers the signer information based on the registered biometric information by connecting to the authentication server 300 (S315). Particularly, the received biometric information of the signer includes the biometric information for user identification and the biometric information for document confirmation. Here, the handwritten signature (SIG) may be used as the biometric information for document confirmation. The handwritten signature for document confirmation (SIG) may include one or both of the image information (SIG.image) of the handwritten signature for document confirmation and the biometric characteristic information (SIG.bio) of the handwritten signature for document confirmation based on the unique action or behavior of the signer. In addition, the user device 100 generates the private key ($U_{SK}$) and the public key ($U_{PK}$) of the signer to be used for signing on the basis of the previously registered biometric information in the operation S315, transmits the public key ($U_{PK}$) and the signer information ($U_{info}$) to the authentication server 300, and requests the registration of such information.

After the signer registration is completed as described above, process of executing the electronic document is performed upon a request of the signer.

Specifically, the user device 100 receives the biometric information of the signer to be authenticated and performs the user authentication based on the biometric information (S320). This authentication may be performed by checking whether the received biometric information of the user matches the registered biometric authentication for the user.

When the user authentication is completed, the user device 100 may provide the registered signer identification information ($U_{info}$) to the electronic document device 200 (S325). The operation S325 may be replaced by a procedure that the user device 100 accesses the electronic document device 200 to login, performs the user authentication based on the login information, and extracts the signer identification information ($U_{id}$).

Afterwards, the user device 100 may receive and output the electronic document provided by the electronic document device 200 to allow the user to check the electronic document (S330).

In addition, the user device 100 may check whether it is necessary to add the handwritten signature for document confirmation ($SIG_i$) in the electronic document (S335).

If a result of the checking shows that the addition of the handwritten signature for document confirmation ($SIG_i$) is required, the user device 100 receives any required information or mark to be inserted into the electronic document from the signer, and checks and confirms the input of the information or mark (S340). Then, the user device 100 sequentially receives the handwritten signature for document confirmation ($SIG_i$), verifies a matching level with the registered handwritten signature for document confirmation (SIG), and inserts the authenticated handwritten signature into a corresponding position in the electronic document (S345).

The operations S340 and S345 are repeatedly carried out as long as there remains a place in the electronic document where the input of the handwritten signature for document confirmation is required (S350).

On the other hand, if it is determined that the input of the handwritten signature for document confirmation is not required in the operation S335, the user device 100 may immediately receive the information or mark to be inserted into the electronic document from the signer, and check and confirm the information or mark (S355).

After the operation S350 or S355 is completed, the user device 100 receives the signer confirmation for final content of the completed electronic document (D) (S360), and then carries out the user authentication based on the handwritten signature to input the handwritten signature for final document confirmation ($SIG_f$) (S365). This authentication can be performed by receiving the handwritten signature for final document confirmation ($SIG_f$) from the signer and comparing with the registered handwritten signature for document confirmation (SIG).

After the biometric authentication for the handwritten signature is completed, the user device 100 transmits the handwritten signature for final document confirmation ($SIG_f$) to the authentication server 300 for registration (S370). Also, the user device 100 generates the first through third electronic signature values (DS1-DS3) for the received completed electronic document (D'), the handwritten signature for final document confirmation ($SIG_f$), and the handwritten signature for document confirmation ($SIG_i$), respectively, by using the private key ($U_{SK}$) of the signer based on the biometric information for user identification. Further, the user device 100 generates the first encryption data (E1) by encrypting the first electronic signature value (DS1) with the public key ($SP_{PK}$) of the electronic document provider. Similarly, the user device 100 generates the second through fourth encryption data (E2-E4) by encrypting the second through fourth electronic signature values (DS2-DS4), respectively, with the public key ($S_{PK}$) of the authentication server (S375). The user device 100 transmits the first through fourth encryption data (E1-E4) to the electronic document device 200, so that the electronic document device 200 generates the final electronic file for storage (F).

Figure 5:
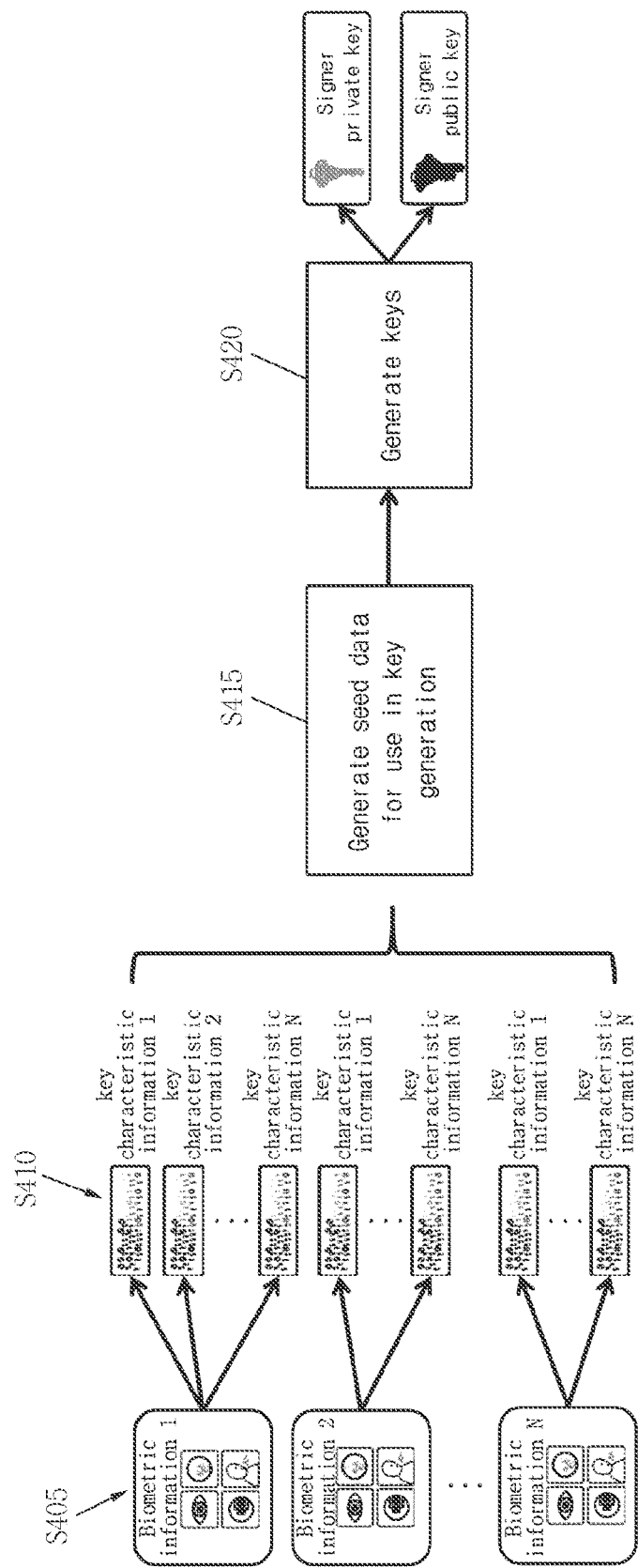
FIG. 5 is a schematic diagram illustrating a process of generating biometric information-based encryption keys in the electronic signature authentication system based on biometric information according to the present disclosure.

FIG. 5 is a schematic diagram illustrating a process of generating encryption keys based on the biometric information in the electronic signature authentication system based on the biometric information according to the present disclosure.

The biometric information used in the present disclosure may be information based on physical characteristics that is unique to each user such as a fingerprint, an iris pattern, a palm veins pattern, a voice, a face, and the like, or may be information based on behavioral characteristics such as a handwritten signature, keystroke and mouse dynamics, and speaking habits.

The present disclosure generates electronic signature based on the biometric information. To this end, one or more biometric information is acquired through biometric information input devices (not shown) (S405).

Afterwards, key characteristic information is extracted from the received one or more biometric information (S410).

Subsequently, seed data for use in the key generation is generated from the extracted key characteristic information (S415).

Then, the asymmetric key pair composed of the private key and the public key is generated by applying the seed data to a key derivation function (S420).

Figure 6:
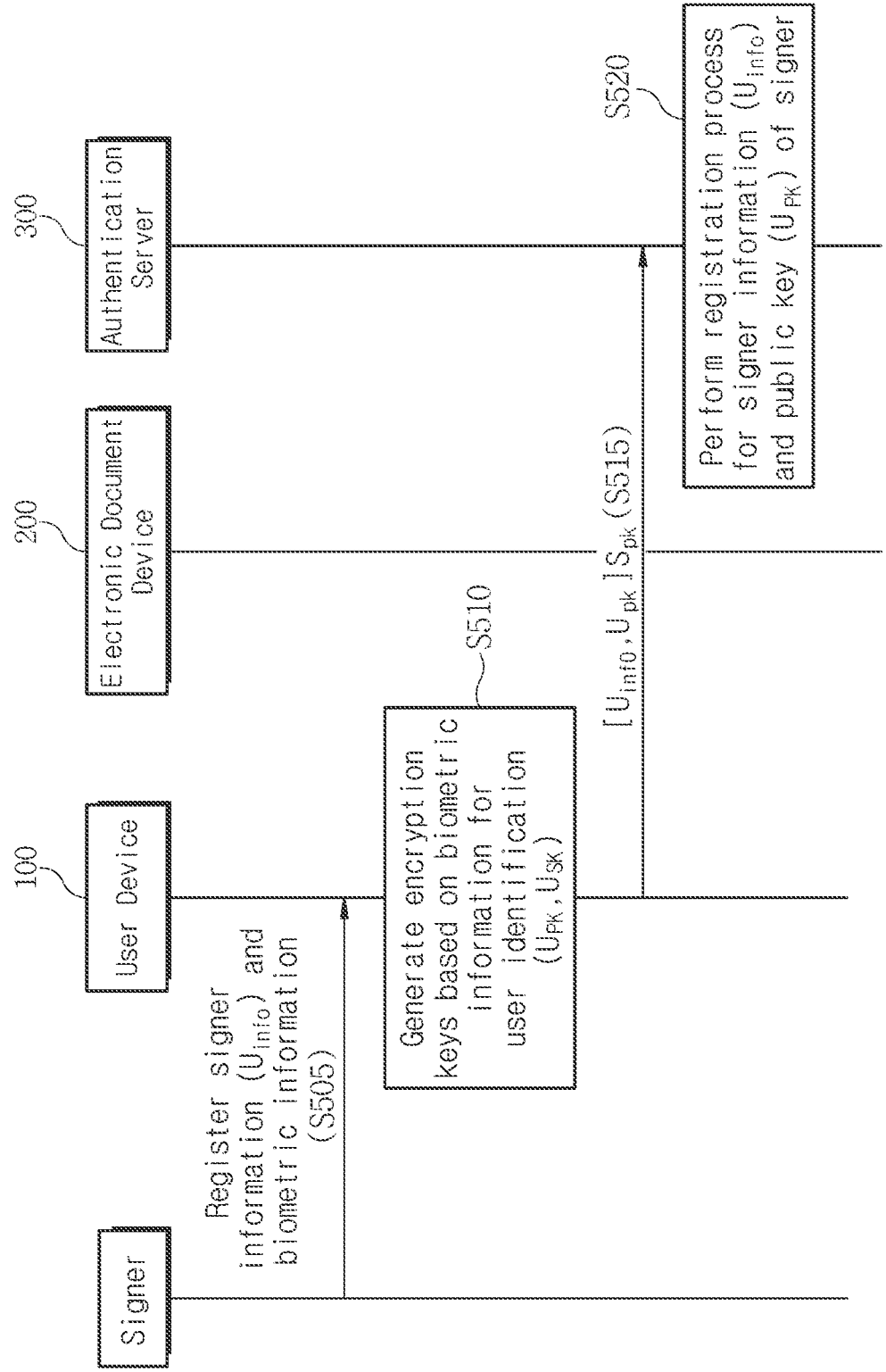
FIG. 6 is a flowchart illustrating a signer registration process, in more detail, in a electronic signature authentication method based on biometric information according to the present disclosure.

FIG. 6 is a detailed flowchart for the operations S125-S140 shown in FIGS. 2A and 3A and illustrates a signer registration process, in more detail, in the electronic signature authentication method based on the biometric information according to the present disclosure Referring to FIG. 6, after receiving the signer information ($U_{info}$) including the signer identification information ($U_{id}$) and the biometric information for user identification which are required for the signer registration (S505), the user device 100 having the biometric authentication application installed therein generates the public key ($U_{PK}$) and the private key ($U_{SK}$) of the signer based on the received biometric information through the procedure shown in FIG. 5 (S510).

When the keys for the electronic signature are generated based on the biometric information, the user device 100 encrypts the signer information ($U_{info}$) and the public key ($U_{PK}$) of the signer using the public key ($S_{PK}$) of the authentication server 300 (($[U_{info}, U_{PK}]S_{PK}$)), transmits the encrypted signer information and the encrypted public key of the signer to the authentication server 300, and requests to register such information (S515). Here, since the signer information ($U_{info}$) and the public key ($U_{PK}$) of the signer based on the biometric information are decryptable only by using the private key ($S_{SK}$) of the authentication server 300, it is possible to prevent exposure or leakage of the signer information ($U_{info}$) transmitted from the user device 100 to the authentication server 300.

In this case, the authentication server 300 can extract the signer information ($U_{info}$) and the public key ($U_{PK}$) of the signer by decrypting the received data with its private key ($S_{SK}$). The authentication server 300 may complete the signer registration process by registering the signer information ($U_{info}$) and the public key ($U_{PK}$) of the signer in a state of being mapped to each other to complete the signer registration process (S520).

Figure 7:
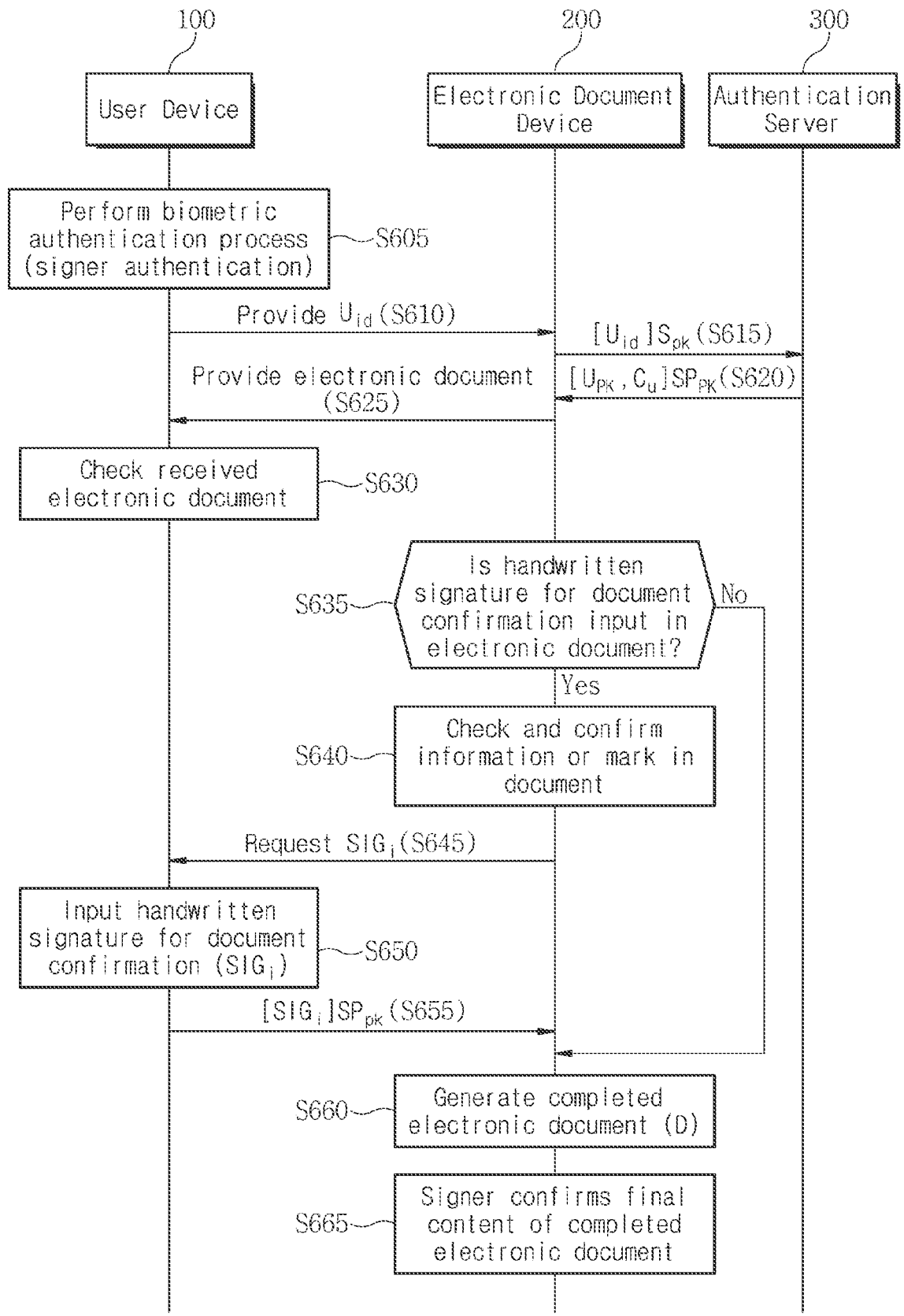
FIG. 7 is a flowchart illustrating a process of creating an electronic document according to a first embodiment of the present disclosure in more detail.
Figure 8:
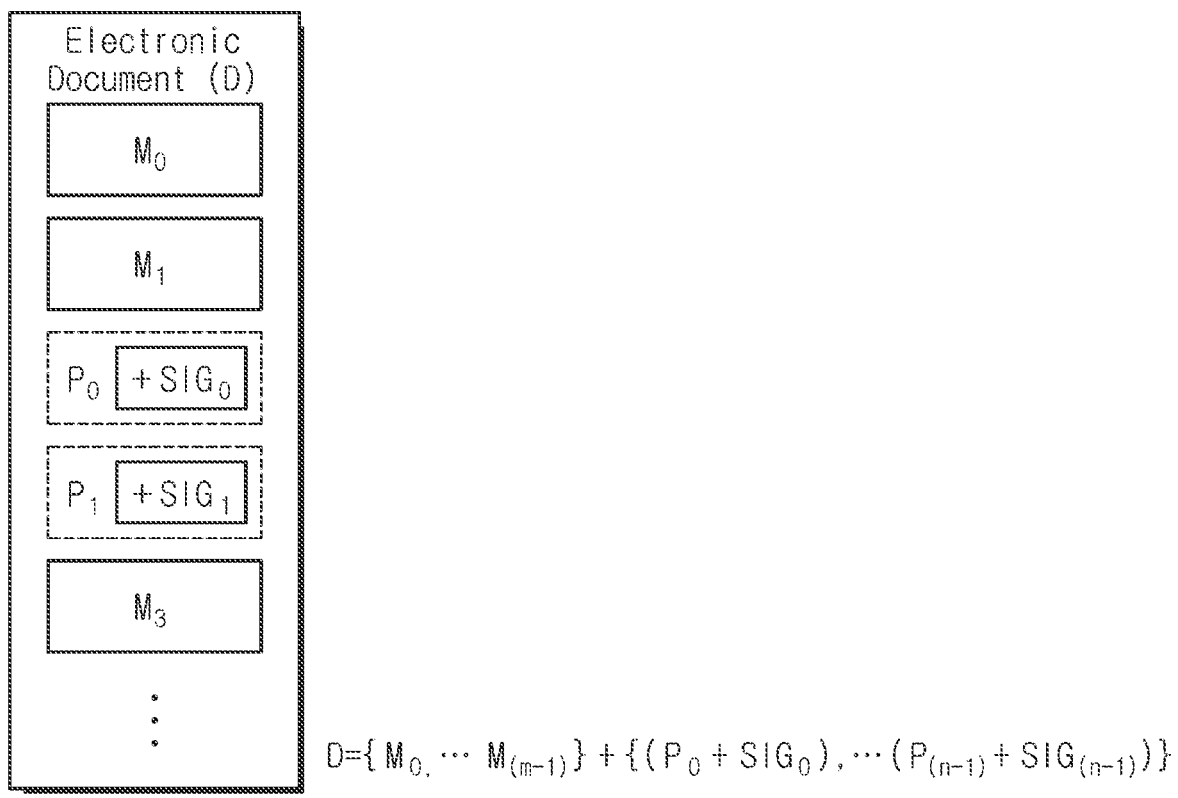
FIG. 8 is a schematic block diagram of an electronic document created by the electronic signature authentication method based on biometric information according to the present disclosure.
Figure 9:
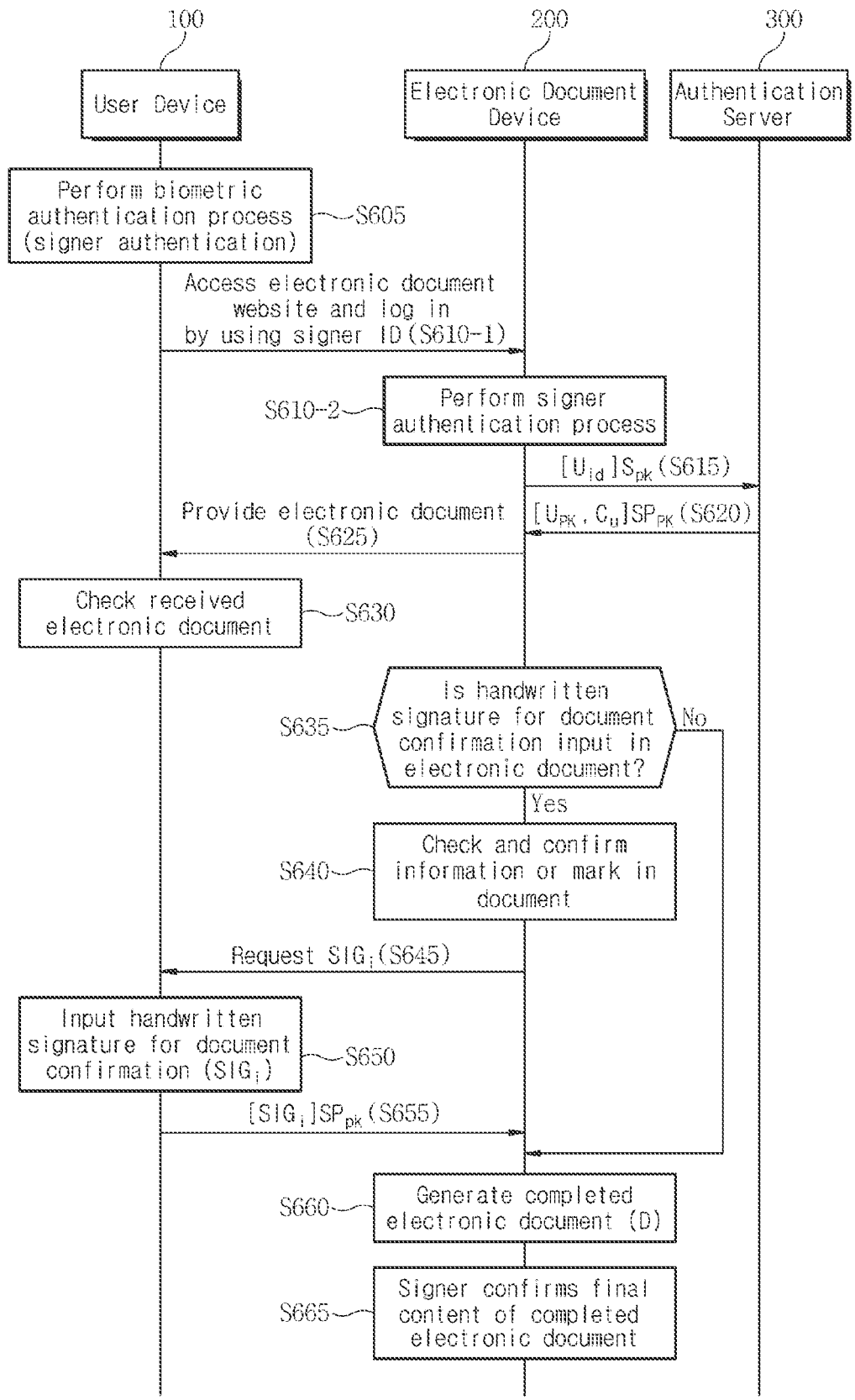
FIG. 9 is a flowchart illustrating a process of creating an electronic document according to a second embodiment of the present disclosure in more detail.

FIG. 7 is a flowchart illustrating a process of creating the electronic document according to a first embodiment in detail, and FIG. 9 is a flowchart illustrating a process of creating the electronic document according to a second embodiment in detail. FIG. 8 is a schematic block diagram of an electronic document created by the process shown in FIG. 7 or FIG. 9. Specifically, FIGS. 7 and 9 show the operations S150 through S190 depicted in FIGS. 2B and 3B in detail.

Referring to FIGS. 7 and 9, when the signer inputs the biometric information to sign the electronic document, the user device 100 compares the input biometric information with the previously registered biometric information to authenticate the signer (S605).

If the authentication of the signer is successful, the user device 100 makes the electronic document device 200 to acquire the public key ($U_{PK}$) of the signer. For example, as shown in FIG. 7, the user device 100 may provide the electronic document device 200 with the signer identification information ($U_{id}$) (S610). Alternatively, as shown in FIG. 9, the user device 100 may access the electronic document device 200 and login by using the signer ID entered by the signer (S610-1). The electronic document device 200 may perform a signer authentication process based on the entered signer ID and extract the signer identification information ($U_{id}$) from the signer information ($U_{id}$) mapped to the authenticated signer ID (S610-2).

In operation S615, the electronic document device 200 having acquired the signer identification information ($U_{id}$) encrypts the signer identification information ($U_{id}$) with the public key ($S_{PK}$) of the authentication server 300 (i.e., $[U_{id}]S_{PK}$) and transmits to the authentication server 300.

The authentication server 300 identifies the signer identification information ($U_{id}$) transmitted by the electronic document device 200 by decrypting the encrypted data using with its private key ($S_{SK}$), extracts the public key ($U_{PK}$) of the signer and the signer information for the electronic document ($C_U$) stored being mapped to the signer identification information ($U_{id}$), and encrypts the extracted information with the public key ($SP_{PK}$) of the electronic document device 200 (i.e., $[U_{PK}, C_U]SP_{PK}$) to transmit to the electronic document device 200 (S620). The signer information for the electronic document ($C_U$) may be some of the signer information ($U_{info}$) to be embedded in the electronic document by a default setting.

Accordingly, the electronic document device 200 may decrypt the encrypted data ($[U_{PK}, C_U]SP_{SK}$) with its private key ($SP_{SK}$) and extract the public key ($U_{PK}$) of the signer and signer information for the electronic document ($C_U$).

Afterwards, the electronic document device 200 provides the user device 100 with the electronic document to be signed (S625), and the user device 100 outputs the electronic document so that the user can check the electronic document (S630).

Then, the electronic document device 200 checks whether the handwritten signature for document confirmation ($SIG_i$) is input in the electronic document (S635).

When an input of the handwritten signature for document confirmation ($SIG_i$) is required, the electronic document device 200 checks whether input field is entered by the electronic document provider or the signer (S640), and requests the handwritten signature for document confirmation ($SIG_i$) from the user device 100 for the field where the handwritten signature for document confirmation ($SIG_i$) is required (S645).

The user device 100 notifies the request for the handwritten signature for document confirmation ($SIG_i$) from the electronic document device 200 to the user, receives the handwritten signature for document confirmation ($SIG_i$) entered through the biometric information input device by the user (S650), and encrypts the information with the public key ($SP_{PK}$) of the electronic document device 200 (i.e., [$SIG_i$]$SP_{PK}$) to transmit to the electronic document device 200 (S655). The electronic document device 200 decrypts the encrypted handwritten signature for document confirmation ([$SIG_i$]$SP_{PK}$) with its private key ($SP_{SK}$), extracts the handwritten signature for document confirmation ($SIG_i$), and inserts it into the electronic document. This process may be repeatedly carried out as many times as the handwritten signature for document confirmation ($SIG_i$) is necessary. In other words, the subscript index "i" in the handwritten signature for document confirmation ($SIG_i$) may have a value of: i=0,1,2, . . . , (n−1).

When the checking of the electronic document including the handwritten signature for document confirmation ($SIG_i$) is completed by the signer, the electronic document device 200 generates the completed electronic document (D) (S660). Here, the completed electronic document (D) may have a structure shown in FIG. 8.

Referring to FIG. 8, assuming that the electronic document includes one or more pages $M_0$, $M_1$, $M_{(m-1)}$ which do not require the handwritten signature for document confirmation and one or more pages $P_0$, $P_1$, . . . , $P_{(n-1)}$ which require the handwritten signature for document confirmation, the completed electronic document (D) includes one or more pages $M_0$, $M_1$, $M_{(m-1)}$ with no handwritten signature for document confirmation and one or more pages ($P_0$+$SIG_0$), ($P_1$+$SIG_1$), ($P_{(n-1)}$+$SIG_{(n-1)}$) combined with respective handwritten signature for document confirmation $SIG_0$, $SIG_1$, $SIG_{(n-1)}$.

The signer may confirm final content for the completed electronic document (D) combined with the at least one handwritten signature for document confirmation ($SIG_i$) (S665).

Figure 10:
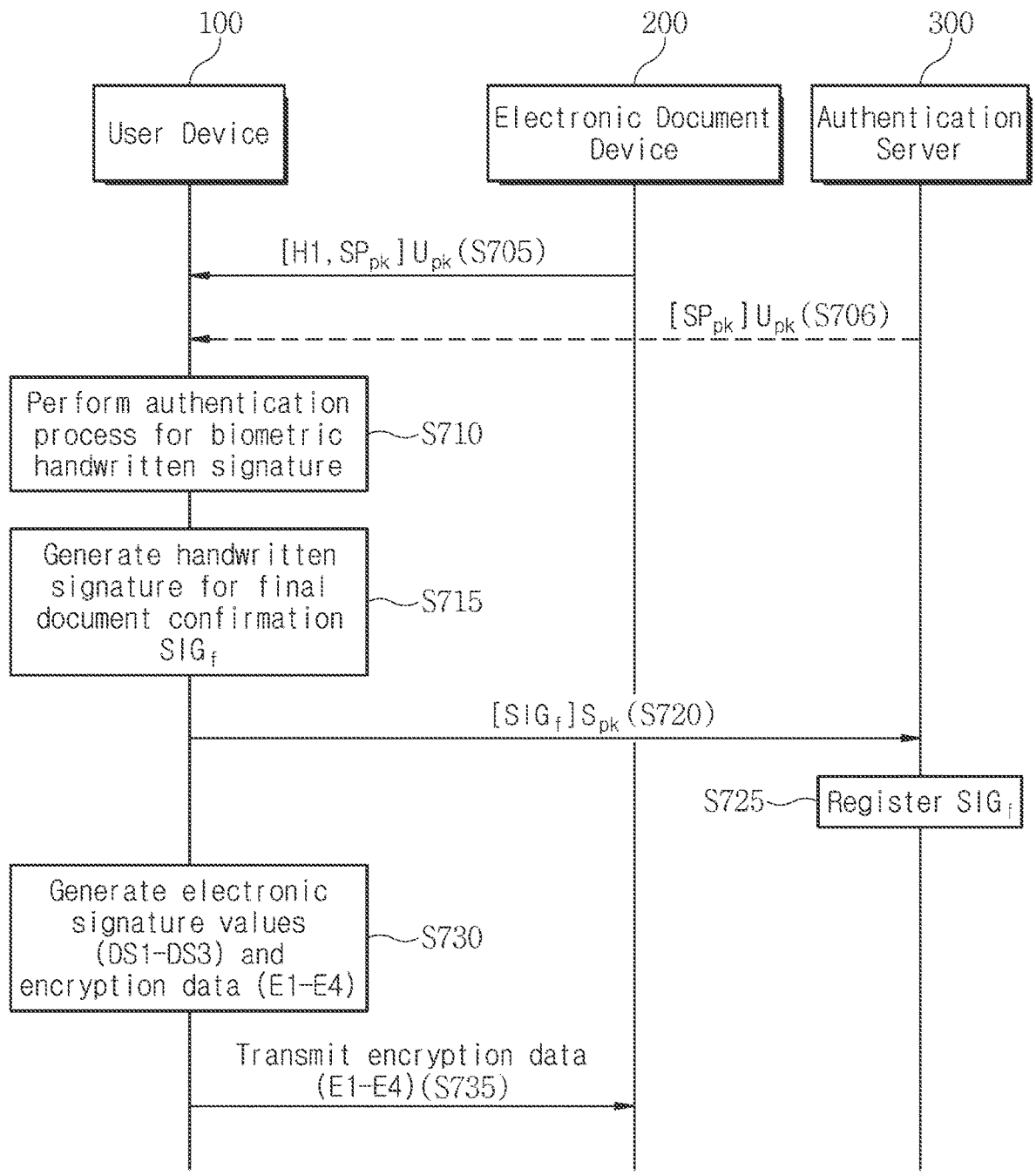
FIG. 10 is a flowchart illustrating a process of generating an electronic signature, in more detail, in the electronic signature authentication method based on biometric information according to the present disclosure.

FIG. 10 is a flowchart illustrating a process of generating the electronic signature for the completed electronic document (D) through the above process of creating the electronic document, in detail, in the electronic signature authentication method based on the biometric information according to the present disclosure. Specifically, FIG. 10 shows the operations S195 through S225 depicted in FIGS. 2C and 3C in detail.

Referring to FIG. 10, the electronic document device 200 encrypts a hash value (H1←hash(D)) of the completed electronic document (D) and the public key ($SP_{PK}$) of the electronic document provider with the public key ($U_{PK}$) of the signer acquired from the authentication server 300 (i.e., [H1, $SP_{PK}$]$U_{PK}$) to transmit to the user device 100 (S705). In operation S705, the electronic document device 200 may encrypt only the hash value (H1) of the completed electronic document (D) with the public key ($U_{PK}$) of the signer (i.e., [H1]$U_{PK}$) and transmit the encrypted data to the user device 100. In such a case, the user device 100 may separately request the authentication server 300 to provide the public key ($SP_{PK}$) of the electronic document provider. In this case, the authentication server 300 may encrypt the public key ($SP_{PK}$) of the electronic document provider with the public key ($U_{PK}$) of the signer (i.e., [$SP_{PK}$]$U_{PK}$) and transmit it to the user device 100 (S706).

Accordingly, the user device 100 may acquire the hash value (H1) of the completed electronic document (D) by decrypting the received encrypted data ([H1, $SP_{PK}$]$U_{PK}$ or [H1]$U_{PK}$) with the private key ($U_{SK}$) of the signer. The electronic document received by the user device 100 and the hash value of the electronic document are denoted by "D'" and "H1'", respectively, to distinguish from the electronic document (D) calculated or generated by the electronic document device 200 and the hash value (H) thereof.

Before generating the electronic signature value, the user device 100 receives the handwritten signature from the signer and performs authentication for the received handwritten signature (S710).

If the authentication of the entered handwritten signature is successful, the user device 100 generates the handwritten signature for final document confirmation ($SIG_f$) for the completed electronic document (D') (S715), encrypts the handwritten signature for final document confirmation ($SIG_f$) with the public key ($S_{PK}$) of the authentication server 300, transmits the encrypted handwritten signature to the authentication server 300, and requests the registration of the handwritten signature for final document confirmation ($SIG_f$) (S720). Accordingly, the authentication server 300 may register the handwritten signature for final document confirmation ($SIG_f$) with the public key ($U_{PK}$) of the signer by mapping to the signer identification information ($U_{id}$).

In addition, the user device 100 generates the electronic signature value and encryption data for the received electronic document (D') corresponding to the completed electronic document (D) (S730). Specifically, the user device 100 calculates the hash value (H1') of the received electronic document (D') and the hash value (H2) of the handwritten signature for final document confirmation ($SIG_f$) (i.e., H1'←hash(D', H2←hash($SIG_f$)). Thereafter, the user device 100 generates the first electronic signature value (DS1) for the received electronic document (D') by encrypting the hash value (H1') with the private key ($U_{SK}$) of the signer based on the registered biometric information and generates the second electronic signature value (DS2) for the handwritten signature for final document confirmation ($SIG_f$) by encrypting the hash value (H2) with the private key ($U_{SK}$) of the signer based on the registered biometric information (i.e., DS1←[H1']$U_{SK}$, DS2←[H2]$U_{SK}$). Then, the user device 100 generates the third electronic signature value (DS3) by encrypting the hash value (H3) of the handwritten signature for document confirmation {$SIG_0$, $SIG_1$, $SIG_2$, . . . , $SIG_{(n-1)}$} with the private key ($U_{SK}$) of the signer based on the registered biometric information (i.e., DS3←[H3]$U_{SK}$).

Further, the user device 100 generates the first encryption data (E1) by encrypting the hash value (H1') of the electronic document (D') and the first electronic signature value (DS1) for the electronic document (D') with the public key ($SP_{PK}$)

of the electronic document provider (i.e., E1←[H1', DS1]$SP_{PK}$). The user device 100 generates the second encryption data (E2) by encrypting the hash value (H1') and the first electronic signature value (DS1) with the public key ($S_{PK}$) of the authentication server 300 (i.e., E2←[H1', DS1]$S_{PK}$). The user device 100 generates the third encryption data (E3) by encrypting the handwritten signature for final document confirmation ($SIG_f$), the hash value (H2) of the handwritten signature for final document confirmation ($SIG_f$), and the second electronic signature value (DS2) with the public key ($S_{PK}$) of the authentication server 300 (i.e., E3←[$SIG_f$, H2, DS2]$S_{PK}$). The user device 100 generates the fourth encryption data (E4) by encrypting the handwritten signature for document confirmation {$SIG_0$, $SIG_1$, $SIG_2$, . . . , $SIG_{(n-1)}$}, the hash value (H3) of the handwritten signature for document confirmation {$SIG_0$, $SIG_1$, $SIG_2$, . . . , $SIG_{(n-1)}$}, and the third electronic signature value (DS3) for the handwritten signature for document confirmation {$SIG_0$, $SIG_1$, $SIG_2$, . . . , $SIG_{(n-1)}$} with the public key ($S_{PK}$) of the authentication server 300 (i.e., E4←[{$SIG_0$, $SIG_1$, $SIG_2$, . . . , $SIG_{(n-1)}$}, H3, DS3]$S_{PK}$). The user device 100 transmits the first through fourth encryption data (E1-E4) to the electronic document device 200 (S735).

Figure 11:
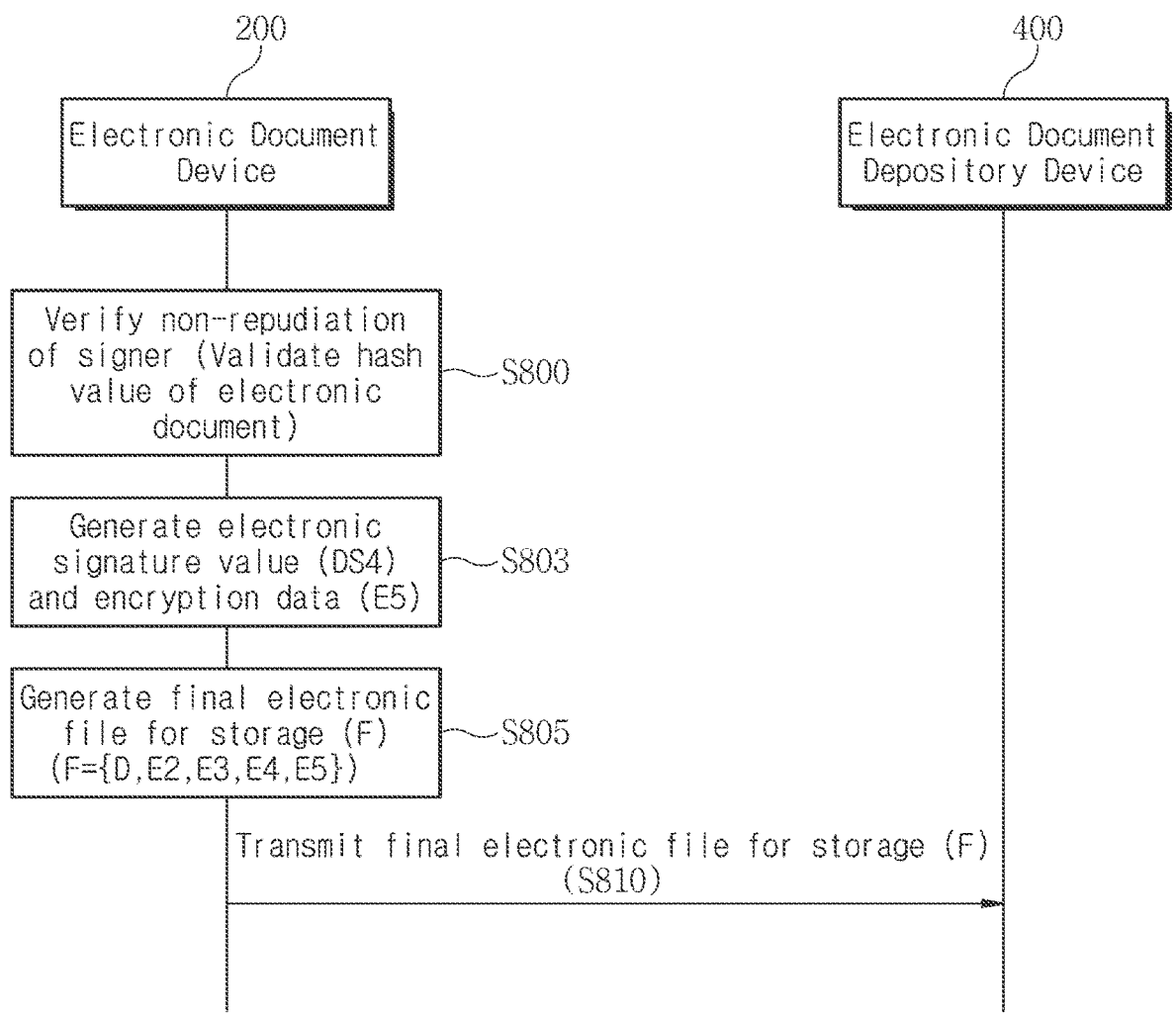
FIG. 11 is a flowchart illustrating a process of handling an electronically signed electronic document in the electronic signature authentication method based on biometric information according to the present disclosure.

FIG. 11 is a flowchart illustrating a process of handling the electronically signed document in the electronic signature authentication method based on the biometric information according to the present disclosure.

Referring to FIG. 11, upon receiving first through fourth encryption data (E1-E4) from the user device 100, the electronic document device 200 decrypts the first encryption data (E1=[H1', DS1]$SP_{PK}$) with the private key ($SP_{SK}$) of the electronic document provider, verifies that the hash value (H1') for the electronic document (D') matches the hash value (H1) sent by the electronic document device 200, and verifies the first electronic signature value (DS1) (i.e., H1≡H1', H1≡[DS1]$U_{PK}$) to verify non-repudiation of the electronic signature of the signer by checking whether the signer has electronically signed the electronic document in accordance with the intent of the electronic document provider (S800). If it is determined that the signer has electronically signed the electronic document in accordance with the intent of the electronic document provider, the electronic document device 200 generates the fourth electronic signature value (DS4) by encrypting the hash value (H1) of the electronic document (D) with the private key ($SP_{SK}$) of the electronic document provider (i.e., DS4←[H1]$SP_{SK}$). Further, the electronic document device 200 generates a fifth encryption data (E5) by encrypting the hash value (H1) of the electronic document (D) and the fourth electronic signature value (DS4) for the electronic document (D) with the public key ($S_{PK}$) of the authentication server 300 (i.e., E5←[H1, DS4]$S_{PK}$) (S803). The electronic document device 200 generates the final electronic file for storage (F) by combining the second through fourth encryption data (E2=[H1', DS1]$S_{PK}$, E3=[$SIG_f$, H2, DS2]$S_{PK}$, and E4=[{$SIG_0$, $SIG_1$, $SIG_2$, . . . , $SIG_{(n-1)}$}, H3, DS3]$S_{PK}$) received from the user device 100 and the fifth encryption data (E5) to the completed electronic document (D) (i.e., F←{D,E2, E3, E4, E5}) (S805).

Finally, the electronic document device 200 transmits the final electronic file for storage (F) to the electronic document depository device 400, so that the electronic document depository device 400 saves the file (F) (S810).

The final electronic file for storage (F) is the electronic document that is created by combining the electronic signature and the handwritten signature to the completed electronic document (D) by the authenticated user based on the biometric information.

Figure 12:
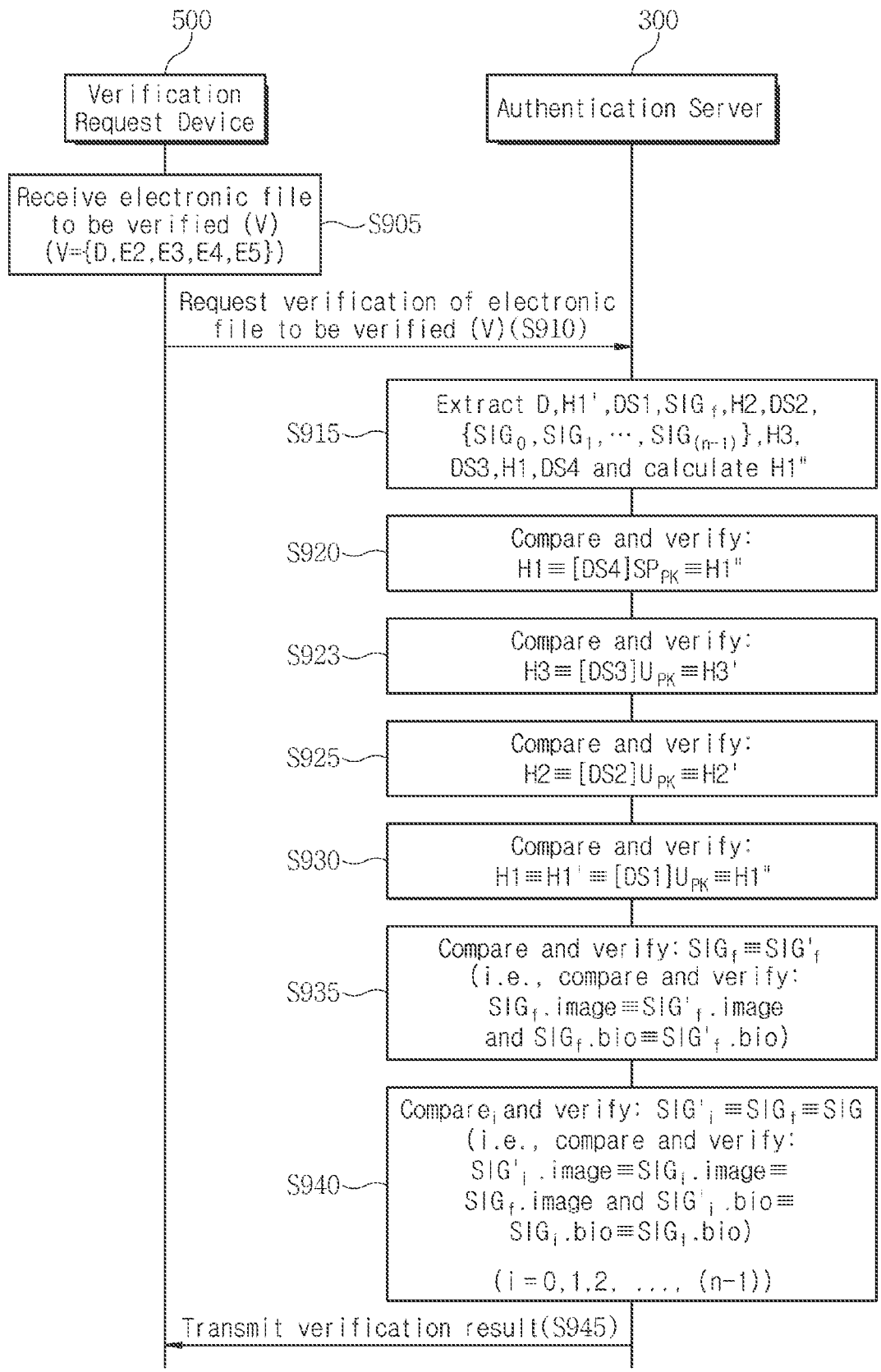
FIG. 12 is a flowchart illustrating a process of validating an electronic document authenticated by the electronic signature authentication method based on biometric information according to the present disclosure.

The electronic document is stored in a state of being combined with the electronic signatures of the signer through the processes described above, so that the electronic document can be validated based on the attached electronic signature through a procedure shown in FIG. 12 when the electronic document is to be used in the future.

FIG. 12 is a flowchart illustrating a process of validating an electronic document authenticated by the electronic signature authentication method based on the biometric information according to the present disclosure. In FIG. 12, the verification request device 500 is a device used by a user who is issued an electronic document file (V) that has been electronically signed based on the biometric information as described above, and can request verification of an issued electronic file to the authentication server 300.

Referring to FIG. 12, the verification request device 500 can receive the electronic file to be verified (V) through an arbitrary path (S905), and can request the verification of the electronic file to be verified (V) to the authentication server 300 if the verification is necessary (S910).

In response to the request, the authentication server 300 can decrypt the second through fifth encryption data (E2-E5) contained in the electronic file (V) with the private key ($S_{SK}$) of the authentication server 300. The authentication server 300 extracts the hash value (H1') of the electronic document (D') received by the user device 100 and the first electronic signature value (DS1) for the hash value (H1') from the second encryption data (E2=[H1', DS1]$S_{PK}$). The authentication server 300 extracts the handwritten signature for final document confirmation ($SIG_f$), the hash value (H2) of the handwritten signature for final document confirmation ($SIG_f$), and the second electronic signature value (DS2) for the hash value (H2) from the third encryption data (E3=[$SIG_f$, H2, DS2]$S_{PK}$). The authentication server 300 extracts the handwritten signature for document confirmation {$SIG_0$, $SIG_1$, $SIG_2$, . . . , $SIG_{(n-1)}$}, the hash value (H3) of the handwritten signature for document confirmation {$SIG_0$, $SIG_1$, $SIG_2$, . . . , $SIG_{(n-1)}$}, and the third electronic signature value (DS3) for the hash value (H3) from the fourth encryption data (E4=[{$SIG_0$, $SIG_1$, $SIG_2$, . . . , $SIG_{(n-1)}$}, H3, DS3]$S_{PK}$). The authentication server 300 extracts the hash value (H1) of the electronic document (D) calculated by the electronic document device 200 for the electronic document and the fourth electronic signature value (DS4) for the hash value (H1) from the fifth encryption data (E5=[H1, DS4]$S_{PK}$). Further, the authentication server 300 calculates the hash value (H1') of the electronic document (D) contained in the electronic file to be verified (V) (H1"←hash(D)) (S915).

Next, the verification of the electronic file (V) is performed as follows.

First, the authentication server 300 compares the hash value ([DS4]$SP_{PK}$) acquired by decrypting the fourth electronic signature value (DS4) extracted from the electronic file to be verified (V) with the public key ($SP_{PK}$) of the electronic document provider, the hash value (H1) calculated by the electronic document device for the electronic document (D) and extracted from the electronic file to be verified (V), and the hash value (H1"←hash(D)) calculated by the authentication server 300 for the electronic document (D) extracted from the electronic file to be verified (V) to verify that they match one another (i.e., H1 [DS4]$SP_{PK}$≡H1"). Through this verification, the authentication server 300 can verify the integrity ensuring that the electronic document (D) extracted from the electronic file to be verified (V) is the electronic document generated by the electronic document provider (S920).

Also, the authentication server 300 compares the hash value ($[DS3]U_{PK}$) acquired by decrypting the third electronic signature value (DS3) extracted from the electronic file to be verified (V) with the public key ($U_{PK}$) of the signer, the hash value (H3) calculated by the user device for the at least one handwritten signature for document confirmation $\{SIG_0, SIG_1, SIG_2, \ldots, SIG_{(n-1)}\}$ and extracted from the electronic file to be verified (V), and the hash value (H3'←hash($\{SIG_0, SIG_1, SIG_2, \ldots, SIG_{(n-1)}\}$)) calculated, by the authentication server 300, for the at least one handwritten signature for document confirmation $\{SIG_0, SIG_1, SIG_2, \ldots, SIG_{(n-1)}\}$ extracted from the electronic file to be verified (V) to verify that they match one another (i.e., H3≡$[DS3]U_{PK}$≡H3'). Through this verification, the authentication server 300 can verify the integrity of the handwritten signature for document confirmation $\{SIG_0, SIG_1, SIG_2, \ldots, SIG_{(n-1)}\}$ extracted from the electronic file to be verified (V) (S923).

Also, the authentication server 300 compares the hash value ($[DS2]U_{PK}$) acquired by decrypting the second electronic signature value (DS2) extracted from the electronic file to be verified (V) with the public key ($U_{PK}$) of the signer, the hash value (H2) calculated by the user device 100 for the handwritten signature for final document confirmation ($SIG_f$) and extracted from the electronic file to be verified (V), and the hash value (H2'←hash($SIG_f$)), calculated by the authentication server 300, for the handwritten signature for final document confirmation ($SIG_f$) extracted from the electronic file to verified (V) to verify that they match one another (i.e., H2≡$[DS2]U_{PK}$≡H2'). Through this verification, the authentication server 300 can verify the integrity of the handwritten signature for final document confirmation ($SIG_f$) extracted from the electronic file to be verified (V) (S925).

Also, the authentication server 300 compares the hash value ($[DS1]U_{PK}$) acquired by decrypting the first electronic signature value (DS1) extracted from the electronic file to be verified (V) with the public key ($U_{PK}$) of the signer, the hash value (H1') calculated by the user device 100 for the electronic document (D') received by the user device 100, the hash value (H1) calculated by the electronic document device 200 for the electronic document (D) extracted from the electronic file to be verified (V), and the hash value (H1") calculated by the authentication server 300 for the electronic document (D) extracted from the electronic file to be verified (V) to verify that they match one another (i.e., H1≡H1'≡$[DS1]U_{PK}$≡H1"). Through this verification, the authentication server 300 can verify the non-repudiation of the electronic signature of the signer with respect to the electronic document (D) contained in the electronic file to be verified (V), the non-repudiation of the electronic signature of the electronic document provider with respect to the electronic document (D), the consistency between the electronic document signed by the signer and the electronic document signed by the electronic document provider, and the integrity of the electronic document (D) provided to the signer (S930).

Further, the authentication server 300 compares the handwritten signature for final document confirmation ($SIG_f$) extracted from the electronic file to be verified (V) and the handwritten signature for final document confirmation ($SIG'_f$) that the user device 100 registered previously to verify that they match to each other (i.e., $SIG_f$≡$SIG'_f$). Through this verification, the authentication server 300 can check the validity of the handwritten signature for final document confirmation ($SIG_f$) added to electronic file to be verified (V) and verify the non-repudiation of the signer (S935).

In addition, the authentication server 300 compares the handwritten signature for document confirmation $\{SIG'_0, SIG'_1, SIG'_2, \ldots, SIG'_{(n-1)}\}$ inserted in respective pages of the electronic document (D) included in the electronic file to be verified (V), the handwritten signature for document confirmation $\{SIG_0, SIG_1, SIG_2, \ldots, SIG_{(n-1)}\}$ extracted from the electronic file to be verified, and the handwritten signature for final document confirmation ($SIG_f$) to verify that they match to one another (i.e., $SIG'_i$≡$SIG_i$≡$SIG_f$). Through this verification, the authentication server 300 can additionally check whether each of the handwritten signatures for document confirmation $SIG'_0, SIG'_1, SIG'_2, \ldots$, and $SIG'_{(n-1)}$ combined to the electronic document (D) match to one another (S940).

When the verification is completed, the verification result is transmitted to the verification request device 500 (S945).

While the present disclosure has been described in connection with preferred exemplary embodiments, those having ordinary skills in the art would understood that other modifications based on the technical idea of the present disclosure may also be possible in addition to the disclosed exemplary embodiment. Furthermore, the terms used in this specification and the drawings are used in general senses only to facilitate description and understanding of the disclosure and are not intended to limit the scope of the disclosure.

The methods and modules according to the present disclosure may be driven by the execution of instructions that cause one or more processors to perform the functions and processes described above. The instructions may include interpretable codes such as JavaScript and ECMAScript, for example, executable machine codes, or other kinds of instructions stored in the computer-readable medium. Further, the apparatus according to the present disclosure may be implemented in a distributed system across a network similarly to a server farm or may be implemented in a single computer device.

Although the present specification and drawings describe exemplary device configurations, the functional operations and subject matters described herein may be implemented in other types of digital electronic circuitry, or may be formed computer software, firmware, or hardware including structures and structural equivalents thereof, or a combination of the hardware component and the software component. The subject matter described herein may be implemented by one or more computer program products, in other words, one or more modules of computer program instruction encoded in an intangible computer-readable program storage medium for controlling the operation of the device according to the present disclosure. The computer-readable medium may be a machine-readable storage device, a machine-readable storage substrate, a memory device, a composition of matter that affects the machine readable propagation-type signal, or a combination of one or more of the devices or the matter.

Implementations of the subject matter described herein may include a back-end component such as a data server, a middleware component such as an application server, a frontend component such as a client computer having a graphic user interface or a web browser capable of interacting with an implementation of the subject matter described herein, or a computing system including a combination having at least one of the backend, middleware, or frontend components. The components of the system may be interconnected by any form or medium of digital data communication such as a communications network, for example.

While the present specification contains a number of specific implementation details, it should be understood that they are not to be construed as limitations on the scope of any disclosure or claims, but as a description of features that may be specific to a particular embodiment of a particular disclosure. Certain features described with respect to contexts of independent embodiments may be implemented in combination in a single embodiment. Conversely, various features described in the context of a single embodiment may also be implemented in other embodiments either individually or in any suitable sub-combination. Further, although some features may be described to operate in a particular combination and may be initially depicted as so claimed, one or more features from the claimed combination may in some cases be excluded from the combination, and a claimed combination may be replaced by a sub-combination or a variant of the sub-combination.

Similarly, although the operations are depicted in the drawings in a particular order, it should not be understood that such operations need to be performed in that particular order or sequential order shown to achieve the desired result or all the depicted operations should be performed. In certain cases, multitasking and parallel processing may be advantageous. Also, the fragmentation of the various system components in the above-described embodiments should not be understood as requiring such fragmentation in all embodiments, and the program components and systems described above may generally be integrated together into a single software product or packaged into a multiple-function software product.

Although specific embodiments of the subject matter have been described herein, other embodiments are within the scope of the following claims. For example, the operations defined in the claims may be performed in a different order to still achieve desirable results. By way of example, the process illustrated in the accompanied drawings does not necessarily require that particularly illustrated sequence or sequential order to achieve the desired result. In certain implementations, multitasking and parallel processing may be advantageous.

The descriptions set forth above disclose the best mode of the present disclosure, and is provided to illustrate the disclosure and to enable those skilled in the art to make and use the disclosure. The written description is not intended to limit the disclosure to the specific terminology presented. Thus, although the present disclosure has been described in detail with reference to the above examples, those skilled in the art will be able to make adaptations, modifications, and variations on the examples without departing from the scope of the present disclosure.

Therefore, the scope of the present disclosure should not be limited by the described embodiments but be defined by the appended claims.

INDUSTRIAL APPLICABILITY

The present disclosure is applicable to a field of digital signature authentication of an electronic document. In the generation of an electronic signature for an electronic document, biometric authentication is performed based on the biometric information of the signer so as to assure safety of data. Since encryption keys for the electronic signature are generated based on the biometric information, it is possible to solve the problem of issuing and managing a code unique to each signer for generating the encryption keys for the electronic signature.

By further combining the handwritten signature of the signer in checking and verifying of the signed electronic document, the present disclosure may reinforce the effects of prevention of repudiation of the signer for a generated electronic document, prevention of repudiation of the electronic document provider, verification of whether the electronic document signed by the signer is identical to the electronic document provided by the electronic document provider, and prevention of falsification or tampering of the electronic document committed by the electronic document provider.

What is claimed is:

1. An electronic signature authentication system based on biometric information, comprising:

an authentication server configured to register a public key of a signer generated based on biometric information for user identification and perform authentication of an electronic document that is electronically signed with a private key of the signer generated based on the biometric information for user identification by using the public key of the signer;

an electronic document device configured to request an electronic signature for the electronic document to a user device, extract encryption data from data received from the user device, and generate a final electronic file for storage by combining the encryption data with the electronic document to transfer to the authentication server; and the user device configured to register the biometric information for user identification of the signer and a handwritten signature for document confirmation entered from the signer, generate the public key and the private key of the signer based on the registered biometric information for user identification, register the public key of the signer to the authentication server, receive a handwritten signature for document confirmation of the signer in response to a signature request from the electronic document device, determine whether the received handwritten signature for document confirmation matches the registered handwritten signature for document confirmation, complete the input of the signature in a signature field in the electronic document to be signed, generate an electronic signature value by using the private key of the signer, and generate the encryption data by encrypting the generated electronic value.

2. The electronic signature authentication system based on biometric information of claim 1, wherein the user device comprises:

a biometric authentication module configured to register characteristic information extracted from biometric information of the signer and perform authentication of the electronic signature by comparing the received biometric information with the biometric information registered in advance, a cryptographic module configured to generate the private key and the public key of the signer based on the characteristic information of one or more biometric information registered in advance, generate the electronic signature value based on the private key of the signer, and generate the encryption data by encrypting the generated electronic signature value; and a storage module configured to store the registered biometric information and the private key and the public key of the signer.

3. The electronic signature authentication system based on biometric information of claim 1, wherein the electronic document device acquires signer identification information from the user device, receives the public key of the signer corresponding to the signer identification information from the authentication server by using the signer identification information, and encrypts data to be transmitted to the user device by using the public key of the signer.

4. The electronic signature authentication system based on biometric information of claim 1, wherein the electronic document device receives the handwritten signature for document confirmation of the signer from the user device to insert into at least one page that requires a signature for confirmation of the signer in the electronic document.

5. The electronic signature authentication system based on biometric information of claim 1, wherein the user device generates a handwritten signature for final document confirmation through a user authentication process in response to the signature request, requests registration of the handwritten signature for final document confirmation to the authentication server, calculates a hash value of the electronic document received from an electronic document device and a hash value of the handwritten signature for final document confirmation, generates a first electronic signature value for the electronic document received from the electronic document provider by encrypting the hash value of the electronic document received from the electronic document provider with the private key of the signer, and generates a second electronic signature value for the handwritten signature for final document confirmation by encrypting the hash value of the handwritten signature for final document confirmation with the private key of the signer.

6. The electronic signature authentication system based on biometric information of claim 4 or 5, wherein the handwritten signature comprises at least one of image information of the handwritten signature and biometric characteristic information of the handwritten signature based on the signer's unique behavior in the process of signing.

7. The electronic signature authentication system based on biometric information of claim 5, wherein the user device further generates a third electronic signature value by encrypting a hash value of at least one handwritten signature for document confirmation inserted into the electronic document with the private key of the signer.

8. The electronic signature authentication system based on biometric information of claim 7, wherein the user device generates a first encryption data by encrypting the hash value of the electronic document received from the electronic document device and the first electronic signature value for the electronic document with the public key of the electronic document provider; generates a second encryption data by encrypting the hash value of the electronic document received from the electronic document device and the first electronic signature value for the electronic document with the public key of the authentication server; generates a third encryption data by encrypting the handwritten signature for final document confirmation, the hash value of the handwritten signature for final document confirmation, and the second electronic signature value for the handwritten signature for final document confirmation with the public key of the authentication server, generates a fourth encryption data by encrypting the at least one handwritten signature for document confirmation inserted into the electronic document, the hash value of the at least one handwritten signature for document confirmation, and a third electronic signature value for the at least one handwritten signature with the public key of the authentication server, and provides the first through fourth encryption data to the electronic document device.

9. The electronic signature authentication system based on biometric information of claim 8, wherein the user device receives the public key of the electronic document provider from the electronic document device or requests the authentication server to receive the public key of the electronic document provider.

10. The electronic signature authentication system based on biometric information of claim 8, wherein the user device calculates the hash value of the received electronic document from the received electronic document.

11. The electronic signature authentication system based on biometric information of claim 8, wherein the electronic document device verifies that the signer has electronically signed the electronic document as an expectation of the electronic document provider by extracting the hash value of the electronic document received by the user device and the first electronic signature value by decrypting the first encryption data with the private key of the electronic document provider, and verifies whether the signer has electronically signed the electronic document in accordance with the intent of the electronic document provider by comparing the hash value acquired by decrypting the first electronic signature value extracted from the first encryption data with the public key of the signer, the hash value of the electronic document extracted from the first encryption data, and the hash value calculated by the electronic document provider for the electronic document with each other.

12. The electronic signature authentication system based on biometric information of claim 8, wherein the electronic document device generates a fourth electronic signature value by encrypting the hash value calculated by the electronic document provider for the electronic document with the private key of the electronic document provider, generates a fifth encryption data by encrypting the hash value calculated by the electronic document provider for the electronic document and the fourth electronic signature value for the electronic document with the public key of the authentication server, and combines the second through fourth encryption received from the user device along with the fifth encryption data to the electronic document to generate a final electronic file for storage.

13. The electronic signature authentication system based on biometric information of claim 12, wherein the authentication server, in response to a verification request for the electronic document, extracts the hash value calculated by the electronic document device for the electronic document and the fourth electronic signature value by decrypting the fifth encryption data combined to the electronic file to be verified with the private key of the authentication server, calculates a hash value of an electronic document extracted from the electronic file to be verified, and verifies integrity of the electronic document assuring that the electronic document extracted from the electronic file to be verified is the electronic document generated by the electronic document provider by comparing the hash value extracted by decrypting the fourth electronic signature value with the public key of the electronic document provider, the hash value calculated by the electronic document device for the electronic document and extracted from the fifth encryption data, and the hash value calculated by the authentication server for the electronic document extracted from the electronic file to be verified with each other.

14. The electronic signature authentication system based on biometric information of claim 12, wherein the authentication server, in response to a verification request for the electronic document, extracts the at least one handwritten signature for document confirmation, the hash value calculated by the user device for the at least one handwritten signature for document confirmation, and the third electronic signature value by decrypting the fourth encryption data combined to the electronic file to be verified with the private key of the authentication server, calculates a hash value of at least one handwritten signature for document confirmation extracted from an electronic file to be verified, and verifies integrity of the at least one handwritten signature for document confirmation included in the electronic file to be verified by comparing the hash value extracted by decrypting the third electronic signature value with the public key of the signer, the hash value calculated by the user device for the at least one handwritten signature for document confirmation and extracted from the fourth encryption data, and the hash value calculated, by the authentication server, for the at least one handwritten signature for document confirmation extracted from the electronic file to be verified with each other.

15. The electronic signature authentication system based on biometric information of claim 12, wherein the authentication server, in response to a verification request for the electronic document, extracts the handwritten signature for final document confirmation, the hash value of the handwritten signature for final document confirmation, and the second electronic signature value for the handwritten signature for final document confirmation by decrypting the third encryption data combined to the electronic file to be verified with the private key of the authentication server, calculates a hash value of the handwritten signature for final document confirmation extracted from the electronic file to be verified, and verifies integrity of the handwritten signature for final document confirmation included in the electronic file to be verified by comparing the hash value extracted by decrypting the second electronic signature value with the public key of the signer, the hash value calculated by the user device for the handwritten signature for final document confirmation and extracted from the third encryption data, and the hash value calculated, by the authentication server, for the handwritten signature for final document confirmation extracted from the electronic file to be verified with each other.

16. The electronic signature authentication system based on biometric information of claim 12, wherein the authentication server, in response to a verification request for the electronic document, extracts the hash value calculated by the user device for the electronic document received by the user device, the first electronic signature value generated by the user device for the electronic document received by the user device, and the hash value calculated by the electronic document provider for the electronic document generated by the electronic document provider by decrypting the second and fifth encryption data combined to the electronic file to be verified with the private key of the authentication server, calculates a hash value of the electronic document extracted from the electronic file to be verified, and verifies at least one of the following: non-repudiation of the electronic signature of the signer, non-repudiation of the electronic signature of the electronic document provider, consistency between the electronic document signed by the signer and the electronic document signed by the electronic document provider, and integrity of the electronic document by comparing the hash value extracted by decrypting the first electronic signature value with the public key of the signer, the hash value calculated by the user device for the electronic document received by the user device, the hash value calculated by the electronic document provider for the electronic document generated by the electronic document provider, and the hash value calculated by the authentication server for the electronic document extracted from the electronic file to be verified.

17. The electronic signature authentication system based on biometric information of claim 12, wherein the authentication server further verifies validity of the handwritten signature for final document confirmation by comparing the handwritten signature for final document confirmation extracted from the third encryption data combined to an electronic file to be verified with the handwritten signature for final document confirmation registered in advance for the signer.

18. The electronic signature authentication system based on biometric information of claim 12, wherein the authentication server further verifies validity of the at least one handwritten signature for document confirmation inserted into the electronic file to be verified by comparing the at least one handwritten signature for document confirmation inserted into the electronic document included in an electronic file to be verified, the at least one handwritten signature for document confirmation extracted from the fourth encryption data combined to the electronic file to be verified, and the handwritten signature for final document confirmation extracted from the third encryption data combined to the electronic file to be verified with each other.

19. The electronic signature authentication system based on biometric information of claim 17, wherein verification of the validity of the handwritten signature for final document confirmation is performed by carrying out at least one of:
  comparing image information of the handwritten signature for the final document confirmation extracted from the third encrypted data combined to the electronic file to be verified with image information of the handwritten signature for the final document confirmation registered in advance for the signer; and
  comparing biometric characteristic information of the handwritten signature for the final document confirmation extracted from the third encrypted data combined to the electronic file to be verified with biometric characteristic information of the handwritten signature for the final document confirmation registered in advance for the signer.

20. The electronic signature authentication system based on biometric information of claim 18, wherein verification of the validity of the at least one handwritten signature for document confirmation is performed by carrying out at least one of:
  comparing image information of the at least one handwritten signature for document confirmation inserted into the electronic file to be verified, image information of the handwritten signature for the document confirmation extracted from the fourth encryption data combined to the electronic file to be verified, and image information of the handwritten signature for the final document confirmation extracted from the third encryption data combined to the electronic file to be verified with each other; and
  comparing biometric characteristic information of the at least one handwritten signature for document confirmation inserted into the electronic file to be verified, biometric characteristic information of the handwritten signature for the document confirmation extracted from the fourth encryption data combined to the electronic file to be verified, and biometric characteristic information of the handwritten signature for the final document confirmation extracted from the third encryption data combined to the electronic file to be verified with each other.

21. In a user device capable of being interfaced to an electronic document device and an authentication server to execute an electronic signature, an electronic signature authentication method based on biometric information comprising:
   calculating a hash value of an electronic document received from the electronic document device;
   generating a handwritten signature for final document confirmation for registering to the authentication server;
   calculating a hash value of the handwritten signature for final document confirmation and a hash value of at least one handwritten signature for document confirmation, generating a first electronic signature value for the electronic document by encrypting the hash value of the electronic document received from the electronic document provider with a private key of a signer, generating a second electronic signature value for the handwritten signature for final document confirmation by encrypting the hash value of the handwritten signature for final document confirmation with the private key of the signer, and generating a third electronic signature value by encrypting the hash value of at least one handwritten signature for document confirmation with the private key of the signer; and
   generating a first encryption data by encrypting the hash value of the electronic document received from the electronic document device and the first electronic signature value with a public key of the electronic document provider, generating a second encryption data by encrypting the hash value of the electronic document received from the electronic document device and the first electronic signature value with a public key of the authentication server, generating a third encryption data by encrypting the handwritten signature for final document confirmation, the hash value of the handwritten signature for final document confirmation, and the second electronic signature value for the handwritten signature for final document confirmation with the public key of the authentication server, and generating a fourth encryption data by encrypting the at least one handwritten signature for document confirmation, the hash value of the at least one handwritten signature for document confirmation, the third electronic signature value for the at least one handwritten signature with the public key of the authentication server, and transmitting the first through fourth encryption data to the electronic document device.

22. The electronic signature authentication method based on biometric information of claim 21, further comprising:
   registering signer information, biometric information for user identification, and a handwritten signature for document confirmation, generating a public key and the private key of the signer based on the registered biometric information for user identification, and registering the public key of the signer to the authentication server,
   upon receiving a request for the electronic signature, performing a signer authentication by receiving biometric information for user identification from the signer and comparing the received biometric information for user identification with the registered biometric information for user identification;
   when the signer authentication is completed, providing signer identification information for acquiring the public key of the signer based on the biometric information for user identification to the electronic document device; and
   upon receiving a request from the electronic document device, receiving a handwritten signature for document confirmation to be combined to the electronic document, comparing the received handwritten signature for document confirmation with the registered handwritten signature for document confirmation, and providing the handwritten signature for document confirmation to the electronic document device if the received handwritten signature for document confirmation matches the registered handwritten signature.

23. In an electronic document device capable of being interfaced to a user device of a signer and an authentication server, an electronic signature authentication method based on biometric information comprising:
   transmitting an electronic document to be signed to the user device;
   receiving, from the user device, a first encryption data generated by encrypting the hash value of the electronic document received by the user device and the first electronic signature value for the electronic document with a public key of an electronic document provider, a second encryption data generated by encrypting the hash value of the electronic document received by the user device and the first electronic signature value for the electronic document with a public key of the authentication server, a third encryption data generated by encrypting the handwritten signature for final document confirmation, a hash value of the handwritten signature for final document confirmation, the second electronic signature value for the handwritten signature for final document confirmation with the public key of the authentication server, and a fourth encryption data generated by encrypting the at least one handwritten signature for document confirmation inserted into the electronic document, the hash value of the at least one handwritten signature for document confirmation, and a third electronic signature value for the handwritten signature for document confirmation with the public key of the authentication server;
   generating a fourth electronic signature value by encrypting the hash value calculated by the electronic document provider for the electronic document with the private key of the electronic document provider and generating a fifth encryption data by encrypting the hash value calculated by the electronic document provider for the electronic document and the fourth electronic signature value with the public key of the authentication server; and
   combining the second through fourth encryption received from the user device along with the fifth encryption data to the electronic document to generate a final electronic file for storage,
   wherein the first through third electronic signature values are generated by using the private key based on the biometric information of the signer.

24. The electronic signature authentication method based on biometric information of claim 23, further comprising:
extracting the hash value of the electronic document received by the user device and the first electronic signature value by decrypting the first encryption data with the private key of the electronic document provider, and verifying whether the signer has electronically signed the electronic document in accordance with the intent of the electronic document provider by comparing a hash value acquired by decrypting the first electronic signature value extracted from the first encryption data with the public key of the signer, the hash value of the electronic document extracted from the first encryption data, and the hash value calculated by the electronic document provider for the electronic document with each other.

25. The electronic signature authentication method based on biometric information of claim 23, further comprising:
acquiring signer identification information of the signer from the user device and acquiring the public key of the signer from the authentication server based on the signer identification information.

26. In an authentication server capable of being interfaced to a user device of a signer and an electronic document device of an electronic document provider, an electronic signature authentication method based on biometric information comprising:
receiving an electronic file to be verified which combines a second encryption data generated by encrypting the hash value calculated by the user device for the electronic document received by the user device and the first electronic signature value for the electronic document with a public key of the authentication server, a third encryption data generated by encrypting the handwritten signature for final document confirmation, a hash value of the handwritten signature for final document confirmation, and the second electronic signature value for the handwritten signature for final document confirmation with the public key of the authentication server, a fourth encryption data generated by encrypting the at least one handwritten signature for document confirmation inserted into the electronic document, the hash value of the at least one handwritten signature for document confirmation, and a third electronic signature value for the handwritten signature for document confirmation with the public key of the authentication server, and a fifth encryption data generated by encrypting the hash value calculated by the electronic document device for the electronic document and a fourth electronic signature value for the electronic document with the public key of the authentication server;
extracting the hash value calculated by the user device for the electronic document received by the user device, the first electronic signature value for the electronic document, the handwritten signature for final document confirmation, the hash value of the handwritten signature for final document confirmation, the second electronic signature value for the handwritten signature for final document confirmation, the at least one handwritten signature for document confirmation inserted into the electronic document, the hash value of the at least one handwritten signature for document confirmation, the third electronic signature value for at least one the handwritten signature for document confirmation, the hash value calculated by the electronic document device for the electronic document, and a fourth electronic signature value for the electronic document by decrypting the second through fifth encryption data combined to the electronic file to be verified with a private key of the authentication server;
calculating a hash value of an electronic document combined in the electronic file to be verified and verifying integrity of the electronic document assuring that the electronic document extracted from the electronic file to be verified is the electronic document generated by the electronic document provider by comparing the hash value calculated by the authentication server for the electronic document extracted from the electronic file to be verified, the hash value extracted by decrypting the fourth electronic signature value with the public key of the electronic document provider, and the hash value calculated by the electronic document device for the electronic document and extracted from the fifth encryption data with each other;
calculating a hash value of the at least one handwritten signature for document confirmation extracted from the electronic file to be verified and verifying integrity of the at least one handwritten signature for document confirmation included in the electronic file to be verified by comparing the hash value calculated, by the authentication server, for the at least one handwritten signature for document confirmation extracted from the electronic file to be verified, the hash value of the at least one handwritten signature for document confirmation extracted by decrypting the third electronic signature value with the public key of the signer, and the hash value calculated by the user device for the at least one handwritten signature for document confirmation and extracted from the fourth encryption data with each other;
calculating a hash value of the handwritten signature for final document confirmation extracted from the electronic file to be verified and verifying integrity of the handwritten signature for final document confirmation included in the electronic file to be verified by comparing the hash value calculated, by the authentication server, for the handwritten signature for final document confirmation extracted from the electronic file to be verified, the hash value of the handwritten signature for final document confirmation extracted by decrypting the second electronic signature value with the public key of the signer, and the hash value of the handwritten signature for final document confirmation extracted from the third encryption data with each other; and
calculating a hash value of the electronic document extracted from the electronic file to be verified and verifying at least one of: non-repudiation of the electronic signature of the signer, non-repudiation of the electronic signature of the electronic document provider, consistency between the electronic document signed by the signer and the electronic document signed by the electronic document provider, and integrity of the electronic document by comparing the hash value calculated by the authentication server for the electronic document extracted from the electronic file to be verified, the hash value of the electronic document extracted by decrypting the first electronic signature value with the public key of the signer, the hash value calculated by the user device for the electronic document received by the user device, and the hash value calculated by the electronic document provider for the electronic document generated by the electronic document provider with each other.

\* \* \* \* \*